US009866561B2

(12) United States Patent
Psenka et al.

(10) Patent No.: US 9,866,561 B2
(45) Date of Patent: *Jan. 9, 2018

(54) ENHANCED USER INTERFACE AND DATA HANDLING IN BUSINESS INTELLIGENCE SOFTWARE

(71) Applicant: eThority, LLC, Charleston, SC (US)

(72) Inventors: Michael Psenka, Sullivan's Island, SC (US); Michael D. Booty, Walterboro, SC (US); Brian Duncan, Ladson, SC (US)

(73) Assignee: ETHORITY, LLC, Charleston, SC (US)

( * ) Notice: Subject to any disclaimer, the term of this patent is extended or adjusted under 35 U.S.C. 154(b) by 149 days.

This patent is subject to a terminal disclaimer.

(21) Appl. No.: 14/855,609

(22) Filed: Sep. 16, 2015

(65) Prior Publication Data

US 2016/0006738 A1    Jan. 7, 2016

Related U.S. Application Data

(63) Continuation of application No. 12/156,462, filed on May 30, 2008, now Pat. No. 9,165,044.

(51) Int. Cl.
*G06F 3/0482* (2013.01)
*G06F 3/0481* (2013.01)
(Continued)

(52) U.S. Cl.
CPC ........ *H04L 63/10* (2013.01); *G06F 17/30528* (2013.01); *G06F 17/30554* (2013.01); *H04L 63/20* (2013.01)

(58) Field of Classification Search
CPC ......... G06F 17/30554; G06F 17/30528; H04L 63/10; H04L 63/20
See application file for complete search history.

(56) References Cited

U.S. PATENT DOCUMENTS 7,002,580 B1   2/2006  Aggala et al.
7,233,951 B1   6/2007  Gainer et al.
(Continued)

OTHER PUBLICATIONS

U.S. Appl. No. 12/156,462, Advisory Action dated Apr. 23, 2014, 3 pages.
(Continued)

*Primary Examiner* — Morshed Mehedi
(74) *Attorney, Agent, or Firm* — Kilpatrick Townsend & Stockton LLP

(57) ABSTRACT

A business intelligence and reporting solution can include a databook interface that acts as both as a reporting mechanism and an interface for providing data visualization parameters. In some embodiments, the databook includes a plurality of palettes whereby visualization parameters can be specified through a drag-and-drop interaction with the databook. The databook can include a tab interface to select between data views, graphic visualizations of data currently in the databook, and a composite visualization mechanism that provides output to place one or more rows in context to other data in the databook and/or to forecast trends for one or more databook values. The databook may rely on an underlying dataset collected from multiple distinct sources, such as different databases. The solution may include a security policy restricting access to certain fields, records, and/or columns based on a user's role in an organization, data content, and/or a defined access hierarchy for different data items.

18 Claims, 29 Drawing Sheets

(51) Int. Cl.
   *G06F 3/0486* (2013.01)
   *G06F 17/24* (2006.01)
   *H04L 29/06* (2006.01)
   *G06F 17/30* (2006.01)

(56) References Cited

U.S. PATENT DOCUMENTS

| | | | |
|---|---|---|---|
| 9,165,044 B2 | 10/2015 | Psenka et al. | |
| 2005/0060300 A1 | 3/2005 | Stolte et al. | |
| 2005/0125318 A1 | 6/2005 | Jameson | |
| 2006/0112123 A1* | 5/2006 | Clark | G06F 17/246 |
| 2008/0117839 A1* | 5/2008 | Raju | H04L 12/1813 370/261 |
| 2008/0288306 A1 | 11/2008 | MacIntyre et al. | |
| 2009/0089067 A1* | 4/2009 | Campbell | G06Q 10/10 705/344 |
| 2009/0276692 A1 | 11/2009 | Rosner | |

OTHER PUBLICATIONS

U.S. Appl. No. 12/156,462, Final Office Action dated Jan. 16, 2014, 19 pages.
U.S. Appl. No. 12/156,462, Final Office Action dated Sep. 29, 2011, 19 pages.
U.S. Appl. No. 12/156,462, Non-Final Office Action dated Mar. 31, 2011, 15 pages.
U.S. Appl. No. 12/156,462, Non-Final Office Action dated Jun. 20, 2013, 17 pages.
U.S. Appl. No. 12/156,462, Non-Final Office Action dated Jan. 22, 2015, 23 pages.
U.S. Appl. No. 12/156,462, Notice of Allowance dated Jun. 17, 2015, 5 pages.
Rank Function, Microsoft, Special Edition Using Microsoft Excel, Que, Sep. 11, 2003, 2 pages.
Excel: PercentRank Function, Tech on the Net. Wayback Machine, Dec. 28, 2013, 2 pages.
Microsoft Corp, Microsoft Office 2003 Excel Screenshots, 2003, 17 pages.
Microsoft, Special Edition Using Microsoft Excel, Que, Sep. 11, 2003, 1 page.
International Application No. PCT/US2009/045400, International Search Report and Written Opinion dated Oct. 2, 2009, 9 pages.
Charleston, eTHORITY Expands User-Obvious Business Intelligence Interface With Powerful New Data Visualization Tools, Reuters, Available online at http://www.reuters.com/article/pressRelease/idUS129778+15-Apr-2008+MW20080415, Apr. 15, 2008, 3 pages.
Opearson.Com, Ranking Data in Lists, Pearson Software Consulting LLC, Pearson Software Consulting (www.opearson.com), Sep. 19, 2007, 7 pages.

* cited by examiner

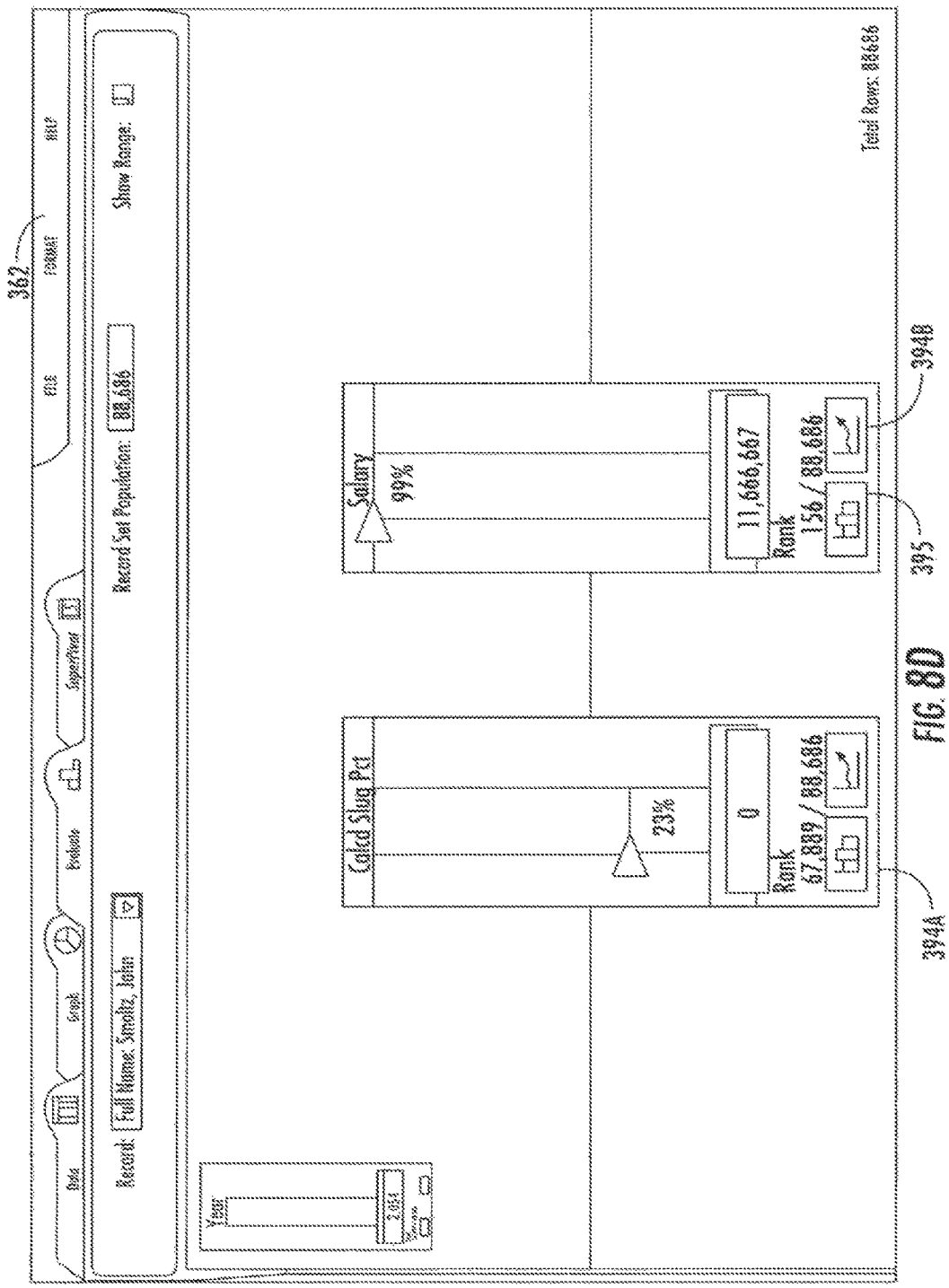

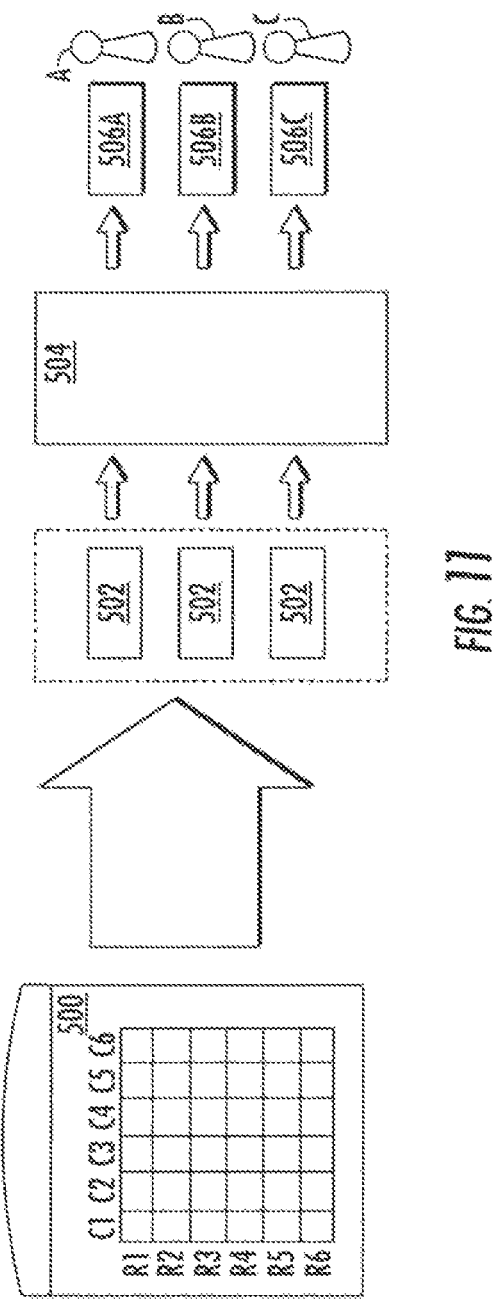

ENHANCED USER INTERFACE AND DATA HANDLING IN BUSINESS INTELLIGENCE SOFTWARE

CROSS REFERENCE TO RELATED APPLICATION

This is a continuation of U.S. patent application Ser. No. 12/156,462, filed May 30, 2008, entitled "Enhanced User Interface and Data Handling in Business Intelligence Software" (Allowed), which is hereby incorporated in its entirety by this reference.

BACKGROUND

Computerized data processing and management has revolutionized industries and organizations of all types, including, but not limited to, government organizations and entities involved in education, banking/finance, health care, communications, and manufacturing. Further non-limiting examples include data management services, such as hosting services, library reference services (e.g. Lexis/Nexis or Westlaw) and the like.

As an organization grows, however, its reliance on computerized data processing and management will often increase. For example, a large manufacturing or service company, educational institution, or governmental organization may rely upon numerous databases and other data management systems. As but one specific example, an organization may maintain data management systems devoted to the organization's internal finances, additional systems dedicated to personnel/human resources purposes, and still further systems related to the substantive operations of the organization (e.g. inventory, materials, and sales data for a manufacturing enterprise).

In reality, the actual number and organization of systems may be even more complicated—for example, rather than a unified "human resources" data system, an organization may maintain employee performance data using a first data management system, insurance information in a second system, payroll information in a third system, and employee performance data in a fourth system.

The various data management systems may be associated with dedicated hardware in some instances. However, some data management systems may be supported by the same hardware. Nonetheless, data typically must be accessed separately according to the particulars of each system.

An issue that may even further complicate matters is incompatibility between various data systems. For example, various data processing systems may have been added over time as an organization expanded, and thus the systems may rely on different underlying software, syntax, and the like.

Yet another issue that arises in parallel with the number and arrangement of data access systems is the sheer volume of data. The actual amount of information available may be beyond the amount that any natural person could conceivably review manually, such as by viewing database records one-by-one without a specific search. Regardless of the amount of actual data, it may be maintained only in a computer-accessible form, precluding any sort of manual review.

From an end-user standpoint, the multiplicity of data sources and amount of available data in an organization can range from an inconvenience to a major problem. For instance, one or more people making a decision based on data housed in multiple sources will need access to the data in some sort of correlated form. The decisionmakers may desire specific information but may have little or no idea where or how the underlying data is organized. This may be especially frustrating for a decisionmaker who "knows" (through his or her experience and/or past activities with a particular issue) what the data "should" say, but needs hard data to back up his or her position.

The decisionmaker(s) may personally access and correlate the data, but this will generally take an appreciable amount of time and skill. In many instances, the decisionmaker(s) cannot efficiently access the data—for example, a middle manager may not be capable of constructing a set of SQL queries to access the desired information.

An alternative is to provide specialists to prepare data for the decisionmaker(s). However, the typical organization's resources (such as IT personnel) may be limited, and it may take time even for the specialists to access the desired data. Another consideration is that the data access specialists, while having a great deal of knowledge as to how to access the data, may not have the decisionmaker's depth of knowledge as to why the data is needed. Thus, even if detailed instructions are provided by the decisionmaker(s), the resulting data may not be exactly what the decisionmaker(s) need or had in mind, and the entire process may need to be repeated.

SUMMARY

In accordance with one or more aspects of the present subject matter, a business intelligence/data mining solution can provide an intuitive user experience for a decisionmaker (or other user) that wishes to access data from multiple sources. For example, by providing a flexible, visually-oriented user interface in some embodiments, end users can be spared the drudgery typically involved with creating reports or other documentation based on data from multiple sources, or even a single source. In some embodiments, the user experience may be enhanced in unexpected ways by the particular selection and arrangement of interface features.

For example, several embodiments discussed below make use of a "databook" interface. The "databook" is a user interface that acts as both a reporting tool for visualizing data (by direct output and/or by other representations such as charts, graphs and the like) and as a mechanism whereby the user can specify parameters defining the databook. For example, as noted below, the user can define parameters controlling how data is grouped, sorted, or filtered for inclusion in the databook and can define parameters specifying how data in the databook is to be visualized.

In some embodiments, a computer software application can comprise an extract, transform, and load module which acts as a mechanism for automatic or assisted discovery and extraction of data from one or more data sources. In some embodiments, the extracted data can be placed into a dataset that is used to actually output various reports. The dataset may be stored separately from the one or more data sources. Thus, the "original" data system can be spared repeated access while reports are generated.

However, in some embodiments, a "live import" configuration is used wherein the operational data set maps to the "original" system or systems containing the data in order to provide for more up-to-date access to information. Ultimately, the data source(s) used to provide data via a databook may include both data from live imports and data separately extracted into the operational data store in some embodiments. Locally-stored data (i.e. data on an end-user's computer system or device) may be made available for access To avoid confusion, the inclusive term "operational dataset" is used herein to refer to data accessed for use in the databook, and may include data accessed directly from one or more data systems as well as data copied from such systems into an operational data store specifically for use by the software solution. Querying an operational dataset may comprise querying memory of the device(s) providing the operational data store and containing data copied from other sources; additionally or alternatively, querying an operational dataset may comprise querying one or more local or remote data sources directly.

The computer software application can further comprise a data visualization component. In some embodiments, the data visualization component comprises a databook user interface that delivers data shaping, definition, and enhancement of data provided from the operational data store.

In some embodiments, the databook interface can comprise a display of data rows and columns of data from the operational data set, along with options to refine how the data is visualized in the databook. The databook can thereby act as both a reporting mechanism and interface. The databook may be rendered, for example, in response to an input from a user requesting a specific type of report. The type of report may be specified by the user via the databook in some instances. However, the report may be pre-defined by the user, or by another user, at an earlier time, and can be accessed by applying one or more databook definition parameters to an operational dataset.

For example, the report may define one or more categories of data that are of interest. A "payroll" report, for instance, may include columns indicating first and last name, salary, address information, job title, and years of service. This information may be a subset of all HR/finance information in the operational data set.

Notably, the information included in the report may ultimately have originated from multiple discrete data sources. Continuing with the "payroll" example, the first and last name and address information may originate from a "personnel" database, salary information may originate from a "finance" database, while job title and years of service may originate from an "employment" database.

The report may consolidate or filter information from multiple records. Continuing with the "payroll" example, each particular person may have multiple salary records, e.g. a salary record for each year or for each position. The report may define which salary record item(s) are of interest. This may depend, of course, upon the needs of the end user. For example, an end user evaluating performance over time may be interested in salary histories, and thus may desire a report with all salaries for each person, while another end user evaluating cash flow during the current time period may desire a report with current salaries only.

In some embodiments, the databook interface includes one or more palettes, which can be used by an end user to specify databook definition parameters to thereby filter data, sort data, group rows of data together for browsing, and/or to trigger the application to generate one or more other display types. For example, a "group" palette may allow a user to drag one or more columns of interest to indicate a hierarchy for grouping the data. An initial report of tens of thousands of data rows may be condensed to thousands (or hundreds) of rows for easier browsing.

Returning to the "payroll" example above, each individual may have a number of salary records. Without filtering or grouping, the initial databook may include multiple rows for the same individual but at different salaries. A user interested in examining the data may group the records by "individual" by dragging the first and last names of the individual (or another identifier, such as employee number, etc.). The rows in the report can then be grouped by individual and/or other parameters.

The consolidated data, however, is still accessible through the databook in some embodiments. For example, the user may produce a report of a particular individual's salary over time by dragging a row to a "filter" palette to isolate the particular individual(s) of interest. Dragging and dropping a row may trigger one or more interfaces, such as dialog boxes, whereby the user can indicate the parameters in greater detail, such as date ranges of interest.

In some embodiments, the databook interface includes additional functionality. For example, the databook interface may include an input point whereby a user can trigger a visualization based on the databook. For example, a "graph" tab may present a user with choices for producing a graph or chart based on data in the databook, such as chart type, what data is displayed on which chart axis, etc. One or more graphs of any suitable type can be rendered based on the data currently in the databook (i.e. the data as obtained from the operational data set based on the definition parameters).

In some embodiments, the databook interface further comprises a composite data visualization mechanism. For instance, the composite data visualization mechanism may perform one or more statistical analyses of all rows of one or more particular columns in the databook for comparison to one or more values of a selected row. The results of that analysis may be visualized in any number of ways. In some embodiments, an "evaluate" tab triggers the data visualization mechanism, and the results are presented as a series of rankings, with one ranking for each column evaluated. In other embodiments, the results are presented via a histogram that allows a user to easily view the distribution for one or more parameters of interest.

In certain implementations, the composite data visualization mechanism includes trend analysis for one or more columns. For example, if rows of a particular dataset can be recognized as referring to the same subject (e.g. by sharing a particular column value such as "name") and those rows include a plurality of changing values (e.g. "salary" by "year"), the data visualization mechanism can include a trend analysis for the changing value for each other value of interest (e.g. a "salary" trend for a particular "name"). The trend analysis can, for example, be implemented by using any suitable curve fitting algorithm. The trend analysis can further include a forecast element—for instance, in some embodiments, a sliding bar or other input can be used in order for an end-user to indicate a desired forecast range.

The use of the databook interface may advantageously decouple the data reporting operations from data collection operations in some embodiments. For example, an end-user who is relatively un-technologically-savvy may be able to visualize data of interest by dragging grouping, filtering, sorting, and other parameters to define particular reports of interest. Data defining the current databook view can be stored in any particular format, and will generally specify the columns displayed, and the user-defined parameters (e.g. grouping, filtering, sorting, and/or other parameters). Thus, the databook can be shared amongst multiple users simply by providing the data defining the databook (assuming such other users have access to the operational dataset). If such access is unavailable or unwarranted, the software can support exporting data in any suitable format.

In some embodiments, the software application supports access restrictions whereby users viewing the "same" databook will ultimately have access to different subsets of the data. For example, a security control policy may be defined by one or more administrative users. In some embodiments, the security control policy provides for role-based security control, wherein access to data items depends upon what a particular user's "role" in the organization is. Generally, a "role" will define a set of users with the same level of access. In some embodiments, the security control policy provides for content-based security control or hierarchical based security control.

Content-based security control, for example, conditions a users access based on specific, user defined values in the accessed (or non-accessible) data. Hierarchical-based security control allows access based on a user's position within the organizational hierarchy. For example, different data records may be assigned to different levels of the hierarchy so that "high level" users can access all data, "mid level" users can access certain, but not all records, while "low level" users can only access relatively small subset of the data.

In some embodiments, the databook interface can include a rapid browsing option which may be especially useful when large numbers of rows are in the databook. Namely, the application can identify when the rows of data in the databook will span multiple pages—for example, this will be a function of row number, the height of each row, and available screen space based on the current window size. The databook interface can divide the rows for display on multiple pages and include, for example, scroll bars and/or a page indicator to allow browsing between pages.

However, an additional row browsing interface (referred to as "Swiftseek" below) can be included, with the row-browsing interface comprising a visually-compressed view of the fields of at least one column for at least some of the rows that would otherwise be displayed on multiple pages. For example, the content of the fields may be shown in an extremely reduced size, with the interface including a magnified view area that can be selected by the user to increase the size of a portion of the visually-compressed view. By adjusting the position of the magnified portion, the user can view different parts of the shrunken column(s), for example. The interface can be configured so that, in response to a user input once the user has selected a magnified portion, the rows displayed in the databook are updated to include the rows in the magnified portion. For example, the page may be incremented or scrolled to the page containing the rows in the magnified portion.

In some embodiments, the row browsing interface groups the column(s) displayed into regions, for example, when the number of rows exceeds a predetermined value. Regions can be selected within the row browsing interface to change which rows are shown in the visually-compressed view.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

FIG. 5A is a view of a user interface comprising another exemplary databook;

FIG. 8A illustrates a user interface comprising a still further exemplary databook;

FIGS. 8C-8G illustrate an example of applying a composite data visualization mechanism to the databook of FIG. 8A, including the results of trend analysis and a histogram view illustrating one particular row's relationship to the remainder of the set;

FIGS. 10A-10E illustrate exemplary user interface aspects for defining operational datasets for use in conjunction with one or more databooks;

FIG. 11 is a block diagram conceptually illustrating exemplary aspects of security control policies.

Use of like reference numerals is intended to illustrate like or analogous components.

DETAILED DESCRIPTION

Figure 1:
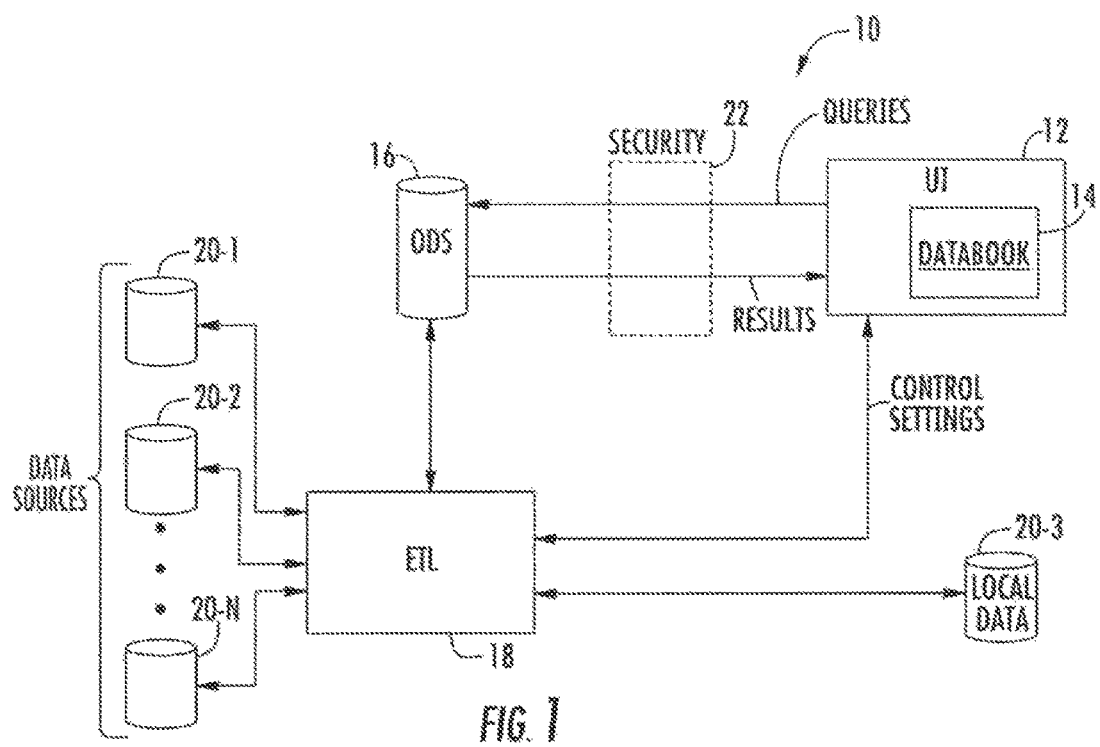
FIG. 1 is a block diagram illustrating components in an exemplary implementation of a business intelligence/data mining software solution.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents FIG. 1 is a block diagram illustrating components in an exemplary business intelligence/data mining software solution 10. For example, the various components depicted in FIG. 1 may comprise modules or components of one or more software applications. In this example, software solution 10 includes a user interface 12 which provides a mechanism for receiving user input and providing output. User input may be received in any suitable way(s), including, but not limited to, keyboards, voice recognition, mouse or other tactile input operations (e.g. clicking, drag-and-drop, etc.). Output may, of course, be visual, but may also include audio or other feedback. Menus, text, and other features can be in any suitable color and may use animation. In some embodiments, the color scheme can be adjusted by the end-user or as part of configuration of solution 10.

In this example, user interface 12 includes databook 14. As will be discussed in further detail below, databook 14 provides data visualization and analysis options for users whereby the users can effectively make use of data without necessarily having detailed knowledge of data access procedures. User interface 12 can comprise additional mechanisms for receiving user input and providing output, including windows, menus, and the like.

User interface 12 is used to provide queries to, and render results based upon, data from an operational data set 16. Operational data set 16 can comprise, for example, a relational or other databases, and includes data ultimately maintained in one or more of a plurality of data sources 20. In some embodiments, operational data set 16 may be maintained in a suitable computer-readable medium and can comprise data imported from one or more of sources 20. However, operational data set 16 may comprise a mapping or other metadata providing for direct access to other sources in some embodiments. In FIG. 1, data sources 20 are indicated as 20-1, 20-2, 20-N to indicate that the number of sources may vary from one on upward. Source 20-3 is shown to indicate that, in some embodiments, solution 10 can integrate locally-stored data (e.g. data available at a user's terminal).

Each data source 20, for example, may comprise one or more databases or other repositories of data. For instance, source 20-1 may represent a payroll database for an enterprise, source 20-2 may represent a sales database, while other sources may comprise human resource (HR) databases including employee personal data (e.g. date of birth, address, social security number, etc.).

Data from sources 20 can be accessed and placed into operational data set 16 by extract, transform, and load (ETL) module 18. ETL module 18 may comprise one or more processes that interface with each database 20 and query each respective database for information of interest. Generally speaking, ETL module 18 should be capable of communicating with each respective data source 20 on the terms required by the source. For example, if database 20-1 is an SQL database accessible over a local area network, ETL module should be capable of initiating a connection to database 20-1, providing a query for the desired information, and saving a copy of the results. If database 20-2 is a database using a different syntax and accessible over a dial-in connection, then ETL module 18 should be capable of initiating a dial-in connection (via hardware) and performing one or more queries to obtain information of interest.

As will be noted below, one or more end-users defining an operational dataset 16 can provide control parameters to ETL module 18, including database access details, login information, one or more queries, and information for use by ETL module 18 in organizing the results of its queries.

In certain embodiments, a databook 14 will rely on at least a subset of data in an operational data set 16 which has resulted from queries of several distinct data sources. In some embodiments, ETL module 18 is configured to cross-reference and otherwise optimize storage of data from multiple requests in order to provide for easier manipulation of data in databook 14. For example, by creating indexes on each column of the dataset so that regardless of the column being used in the query, the database already knows the fastest path to the data. Alternately or additionally, related data may be stored in separate indexed tables and related via key fields such that the work required to retrieve all data needed for a dataset is spread across multiple locations.

FIG. 1 also illustrates security mechanism(s) 22. In some embodiments, software solution 10 supports one or more security control policies to control user access to certain fields, records, and/or other units of data from operational data set 16. This is conceptually illustrated in FIG. 1 as a barrier between UI 12 and operational data set 16. Access control and/or permissions may prevent certain queries from certain users and/or may restrict which results may be provided to users. From an implementation standpoint, in some embodiments, the security control policies are based on one or more values appended to or mapped to particular data records. For example, certain records may be associated with a "lever" or other value used to evaluate access to the record. However, other security policies need not append security data to records. For example, security policies may be based on allowing access to certain data columns and/or records based on the value of the record and/or by evaluating information associated with a particular user. Further details of security control policies will be discussed below.

Figure 2:
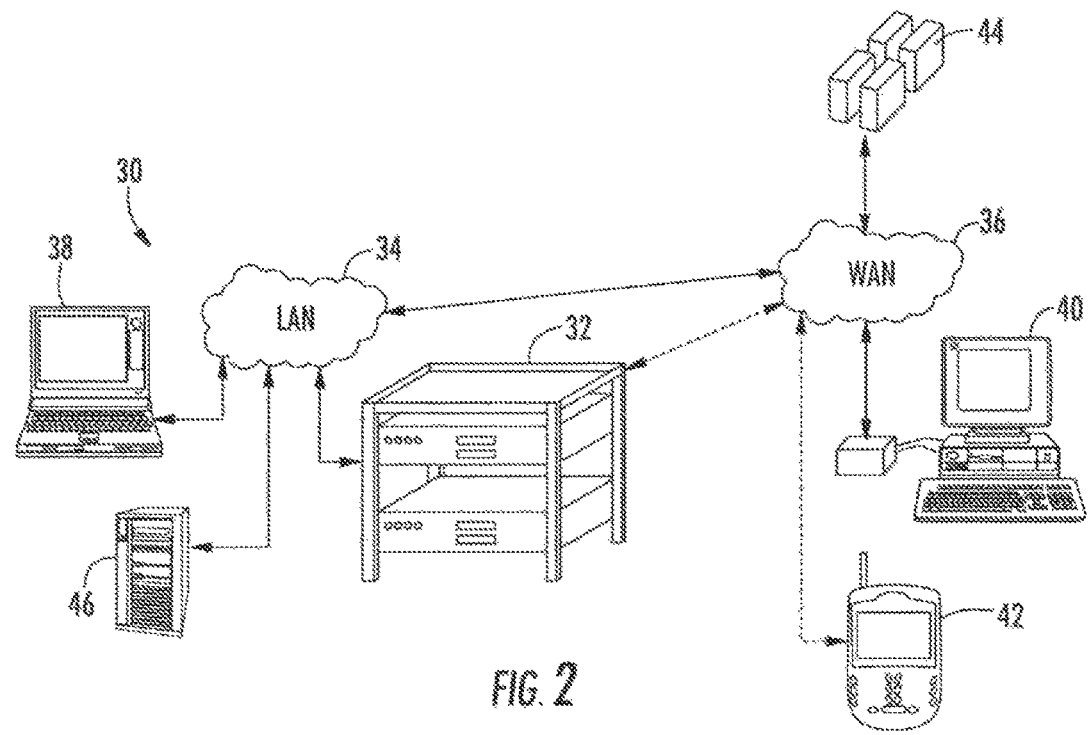
FIG. 2 is a diagram illustrating an exemplary hardware arrangement in which a business intelligence/data mining software solution can be implemented.

Briefly, FIG. 2 depicts an exemplary hardware architecture 30 to illustrate one implementation of software solution 10. In this example, software solution 10 is provided using server arrangement 32, with end-user access via laptop workstation 38, desktop workstation 40, and wireless device 42 (e.g. a cellular phone, PDA, portable computer, etc.). The various computing devices used to provide and access software solution 10 are connected via local area network 34 and wide area network 36. Data server 46 is shown connected to local area network 34, while server farm 44 is shown connected to wide area network 36, in order to emphasize that data sources 20 may reside in local and/or remote hardware. Some data sources 20 may further be accessible from any or all of workstations 38, 40, or even remote device 42.

In some embodiments, software solution 10 is provided as a hosted application and is accessed over the network. For example, ETL module 18 and ODS 16 may reside on server 32, along with supporting applications/processes to generate user interface 12 for sessions conducted using workstations 38, 40, or device 42. In some embodiments, software solution 10 is accessed by end users over a web interface, with the user interface components implemented via FLASH (available from Adobe, Inc. of San Jose, Calif.). However, in other embodiments, user interface components could be implemented via a stand-alone application. Software solution 10 could even be implemented as a single stand-alone application and/or could otherwise be configured for operation from a single machine (with the single machine either including all data sources 20 of interest or accessing those sources from remote machines).

Although not illustrated in FIGS. 1-2, software solution 10 can further comprise adequate files defining its own applications, processes, and supporting data. For example, data defining the particulars of one or more databooks 14 can be stored locally at user machines and/or at other locations as best dictated by the particular implementation. Application data, such as data defining the particulars of ETL requests, ODS storage parameters, and the like, may be stored locally or remotely. Similarly, user data (e.g. user names, passwords, access restrictions, etc.) can be stored as one or more suitable files depending on the particular implementation.

Figures 3, 4:
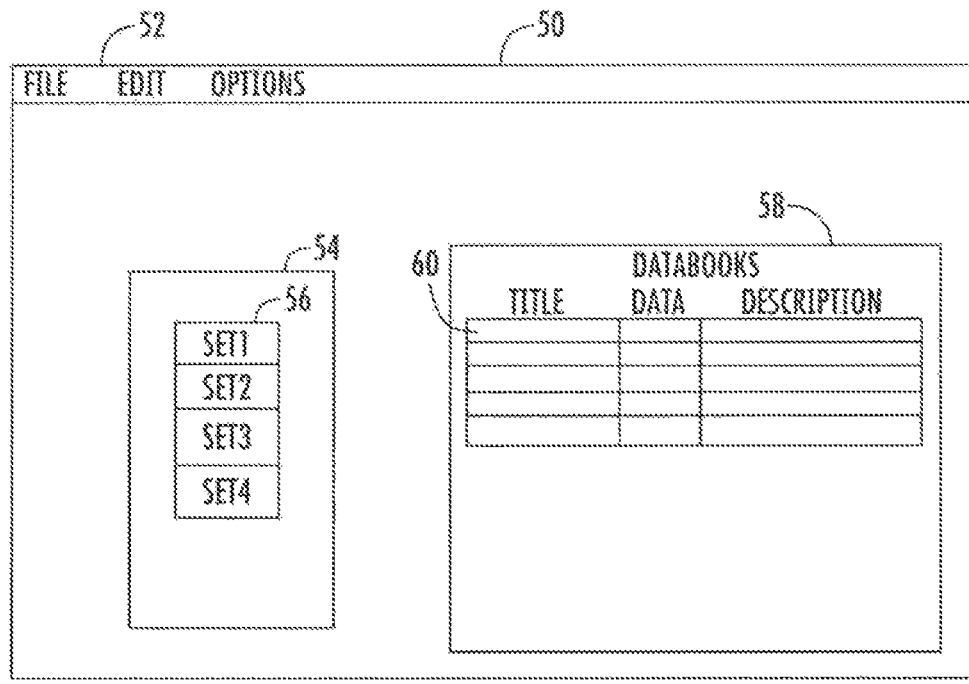
FIG. 3 is an example of a user interface whereby datasets and databooks can be selected.
FIG. 4 is a view of a user interface comprising an exemplary databook.

Turning now to FIGS. 3-4, a simplified example depicting some aspects of a user interface for a business intelligence/ data mining software solution will be discussed. It should be understood that this basic example is provided to illustrate some core concepts, but further detailed examples will be provided below.

FIG. 3 provides an example of a window 50 which may be rendered to select a databook of interest. In this example, contextual menu 52 is provided, along with first and second selection areas 54 and 58. In some embodiments, solution 10 may provide users with multiple collections of databooks. For example, as shown in FIG. 3, a group 56 includes different sets (SET1 through SET4) available for selection. While four sets are shown, an infinite number of collections are possible. Area 58 provides a list 60 of one or more databooks associated with a given set when the set is clicked on by a user.

For example, for a very large organization, solution 10 may be configured to assemble a plurality of operational data sets. For instance, an operational data set of HR data may be collected, an operational data set of manufacturing/sales data may be collected, and an operational data set of data related to governmental compliance may be collected. The composition of the data sets will, of course, depend on what ultimately will be desired for databooks.

In any event, one or more databooks can be created from an operational dataset. Likewise, multiple operational datasets may be combined into one or more databooks. Each databook is both a visualization of data in the operational dataset and an interface mechanism whereby the visualization can be changed.

FIG. 4 depicts a window 62 showing a simplified databook rendered in accordance with one or more aspects of the present subject matter. In this example, the window also includes a contextual menu 52. Contextual menu 52 may, in some embodiments, lead to options whereby a user can define the contents and appearance of the databook and/or export or otherwise distribute the databook contents.

In this example, the databook includes a plurality of tabs 64, 66, and 68, which allow an end user to rapidly switch between different visualization modes. FIG. 4 shows an example of the "data" visualization mode where, as shown at 78, the actual columns 80 and rows 82 of the data are shown in a data display area.

However, not all of the underlying data is necessarily shown. Rather, the databook allows an end user to specify what data is displayed and how such data is displayed. In this example, the databook includes a plurality of palettes 70, specifically a group palette 72, a filter palette 74, and a sort palette 76.

Each palette may support drag-and-drop interaction whereby a user can drag one or more columns of interest to a palette to trigger a change in the databook display. Generally speaking, the databook display is controlled by one or more databook definition parameters. These parameters may, for instance, be defined by the drag-and-drop interaction. Other parameters may be defined using dropdown or other menus. For example, in some embodiments, parameters defining databook contents and appearance (e.g. which columns are displayed, fonts, labels) are provided via a pick list.

For example, this databook includes column headers for record number, name, address, salary, department, and awards. A user interested in viewing only those employees earning above $40,000 could drag the "salary" column header to filter palette 74. In some embodiments, this will trigger the rendering of one or more input windows where a filter can be defined in more detail. For example, the input window(s) may allow a user to specify a desired range for the salary value.

Once the filter has been defined, it can be applied to the data. For instance, the databook may include a button or other suitable interface mechanism that a user can click to trigger a refresh of the data, or the data may refresh automatically. In any event, to refresh the data, the user interface can provide a query to the operational dataset, with the query in this example based on the defined filter. The data returned for display will then include only those records where "salary" is above $40,000 for this example.

As another example, a user interested in viewing records based on salary amount could drag-and-drop the salary header to "sort" palette 76. In some embodiments, the header could be clicked to define whether the results should be displayed in ascending or descending order. Once the sort parameter is defined, the view could be refreshed, such as by querying the operational dataset with appropriate parameters so that the data of interest is returned in the desired order.

Group palette 72 may be useful in visualizing or ordering data without the need to sort or filter the data. For example, a management-level user may be interested viewing data by department. In some embodiments, software solution 10 allows for more in-depth analysis based on grouping data. Rather than merely sorting by department, the management-level user may wish to invoke the additional functionality by dragging the "department" header to group palette 72.

Assuming a user groups data by "department," the resulting data view will depict rows grouped together based on the value of the "department" column. In this example, the databook will show a grouping for "finance," "executive," "sales," "maintenance," and "engineering." For instance, in some embodiments, each group is depicted as a nested list of records.

The "group" command may trigger one or more contextual menus based on the type of data upon which the group is based. For example, if a column upon which grouping will be based contains date information, the user may be presented with options to group by exact date, month, week, quarter, fiscal year, or other suitable organizational units by which the column values could be divided. As another example, a "location" type of column could group by city, state, county, country, etc. Generally speaking, the "group" command can support grouping by different levels within an organizational structure; to do so, of course, the databook should be configured to consult an appropriate record indicating the different levels of organization when constructing a particular group. In some embodiments, the different levels of organization are determined manually and/or automatically by ETL module 18 during construction or updating of the operational dataset upon which the databook is based.

In any event, by defining one or more groups, a user may advantageously view data in an organized manner. However, in some embodiments, grouping is a gateway to additional functionality. For example, the user interface may provide for one or more contextual menus to specify how other data values for columns are handled within a group. Any number of type or operation can be defined, including counting the number of entries in a column within the group, summing the entries, averaging the entries, finding a minimum or maximum, and the like.

For example, a user may right-click the "salary" or "award" column headers to indicate one or more operations to be performed on salary or award data in the group analysis. As one example, a manager may be interested in total awards by department. The manager can right-click the award column header and select "sum" before refreshing the data. The resulting databook view can include each group and can indicate a sum of awards for each group. Similarly, an available option may be the average of a column value. The manager may right-click the "salary" column header before refreshing the data and indicate that the "salary" value is to be averaged. The resulting data view will then include a listing of groups, the average salary, and total awards for each group.

In some embodiments, column-wide data values can be summed, averaged, or otherwise evaluated even in the absence of a group (i.e. across all currently-displayed rows of databook).

In some embodiments, software solution 10 provides for additional data visualization options. As indicated in FIG. 4, the databook includes additional tabs 66 and 68. A user clicking on tab 66 can switch to a chart construction/viewing interface, with one or more charts generated from the current contents of the databook (i.e. the data from the operational data set accessed based on applied filters, groupings, sortings, and the like). Clicking on tab 68 can trigger a unique visualization tool in some embodiments, which is referred to in some embodiments as an "evaluate" utility. These and other aspects will be discussed in further detail below as part of a less generalized example.

Figure 5A:
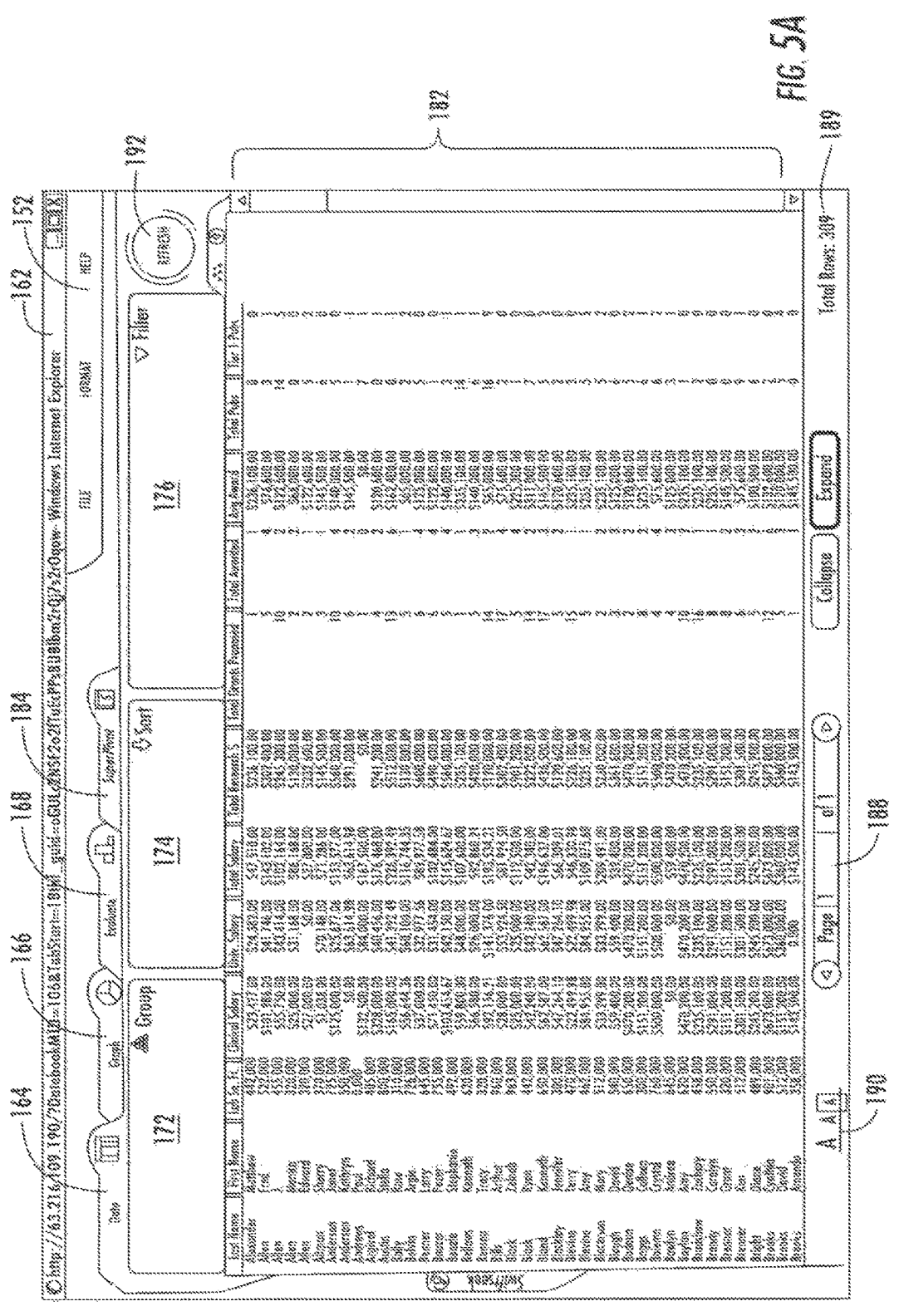

FIG. 5A is a screenshot of an exemplary databook 162. Databook 162 features rows 182 and columns 180 of data. In this example, columns 180 include entries as follows: Last Name, First Name, Lab Sq. Ft., Clinical Salary, Univ. Salary, Total Salary, Total Research $, total grants proposed, total awarded, average award, total publications, and tier 1 publications. For example, databook 162 may originate from a combination of HR and department management data for a university, with the databook being used to evaluate the relative success of different faculty members. The data in this example is meant to be hypothetical and not to represent any actual data or refer to any actual persons.

Databook 162 includes data tab 164, triggering the current view, graph tab 166, evaluate tab 168, and a "superpivot" tab 184, which can trigger another type of data visualization, namely a cross-tabulation of multiply-grouped data. Below the data display area, the databook includes zoom command 190 for varying the size of the rows, page turning interface 188, and a row count indicator 189. Palettes 170 in this example include group palette 172, sort palette 174, and filter palette 176. Contextual menu 152 is included, along with a "refresh" button 192 (since in this example, the databook does not automatically refresh itself). Databook 162 further includes a "swiftseek" tab 186 positioned on its left side, which may be used to rapidly locate one or more rows of interest in the data view, as will be discussed later below.

Figure 5B:
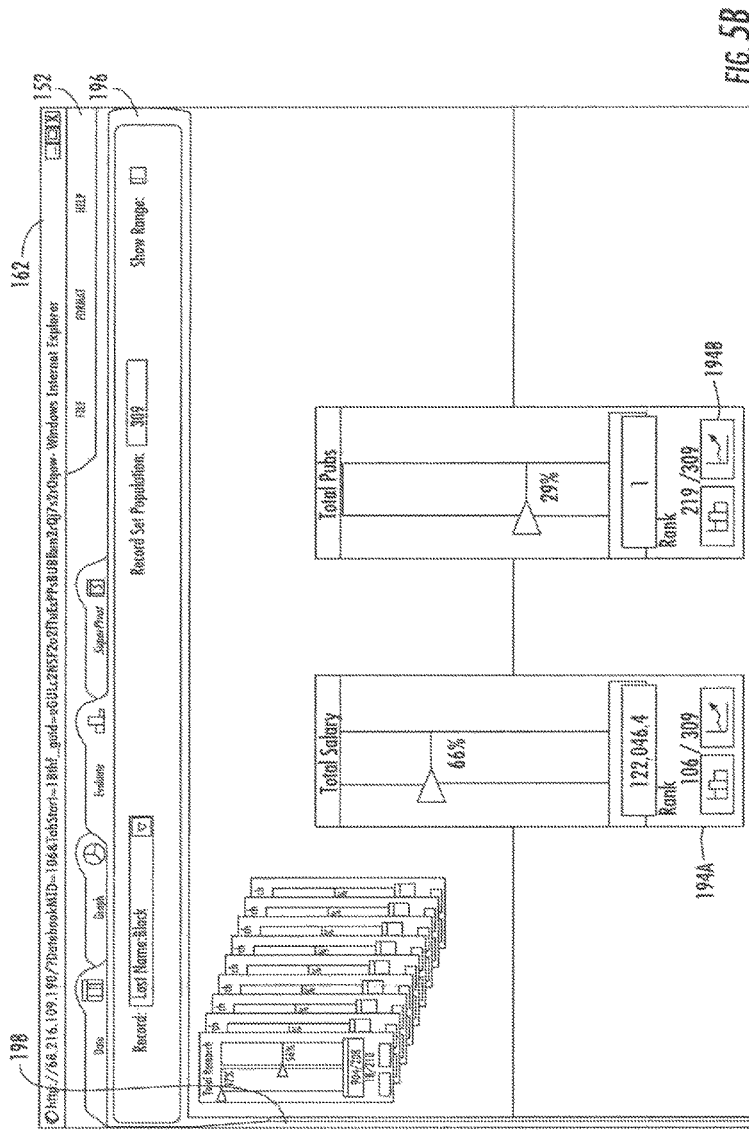
FIGS. 5B-5D illustrate exemplary user-interface aspects of a composite data visualization mechanism triggered by the "evaluate" tab of FIG. 5A.

In this example, a manager will make use of the "evaluate" function by selecting a row corresponding to a faculty member of interest and then by clicking on evaluate tab 168. FIG. 5B shows an example of the results obtained thereby. Databook 162 now shows a plurality of ranking graphs 194 corresponding to data columns. When the "evaluate" view is triggered, software solution 10 performs one or more statistical analysis to compare one or more column values of the row of interest to the remainder of the population of records in the current databook.

In this example, the databook of FIG. 5A contained 309 rows. This may be the "raw" databook view in some cases, while in other cases, the "evaluate" function is carried out on data that has been filtered, sorted, and/or grouped based on other databook definition parameters. In this example, ranking graph 194A depicts the relative position of the row's "total salary" value, while ranking graph 194B depicts the relative position of the row's "total pubs" value. In this example, the row corresponding to hypothetical Professor Black was selected, and it can be seen that his total salary of $122,046.40 puts him at 66% relative to the salaries of others in the population, while his total publication value ("1") puts him only at 29% when compared to other publication counts in the population. In this example, each ranking graph includes the row value and a rank number.

Figure 5C:
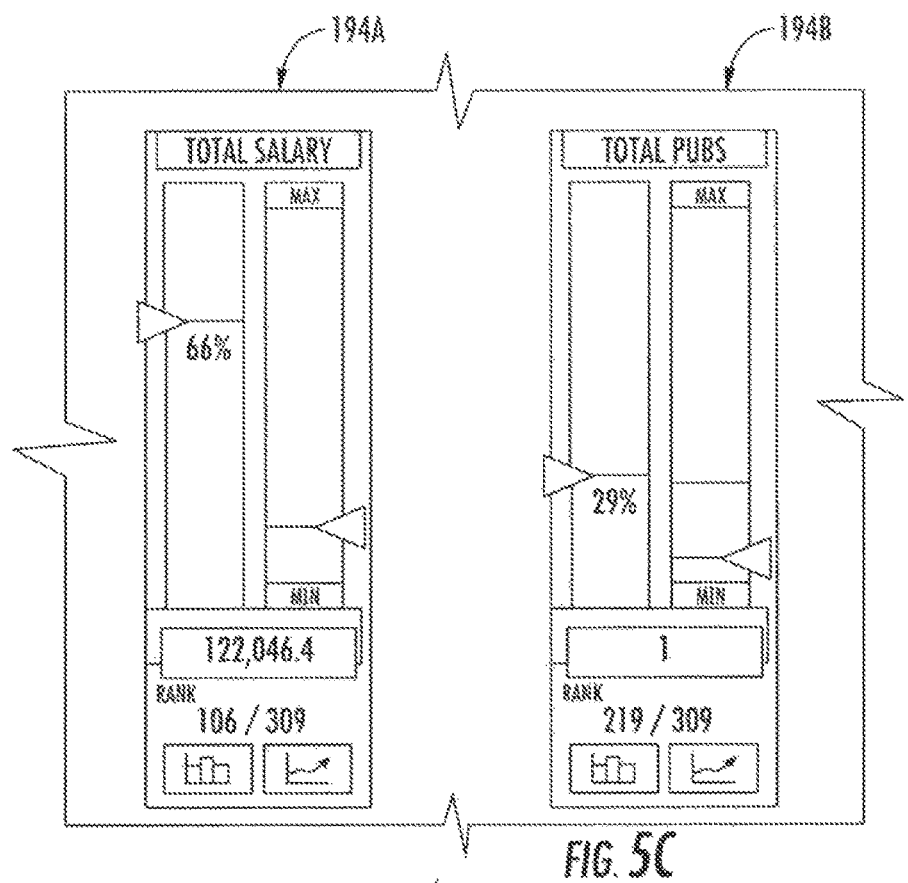

FIG. 5C shows an additional display option which may be triggered to provide context for the rank graphs. For example, in some embodiments, the contextual information is triggered by triggered by clicking the "show range" checkbox at the top right of FIG. 5B. Namely, each rank graph 194 now includes a visual representation of where the row value lies within the population. Rank graph 194A shows that, while Professor Black's salary may be high, in reality his salary is far from the maximum. On the other hand, graph 194B indicates that having a single publication indeed places the professor near the bottom of his cohort. In some embodiments, the ranges are displayed using multiple colors to indicate where the median or mean value lies.

Figure 5D:
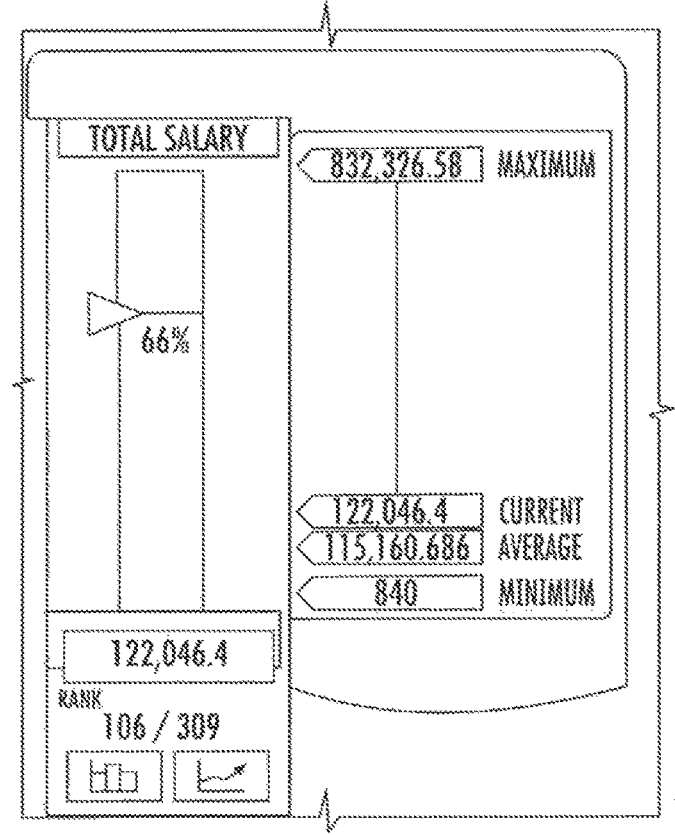

FIG. 5D shows another contextual option which may be triggered by clicking to the side of the rank graphs. In this example for graph 194A, the maximum, minimum, and average values are explicitly shown, with the current value highlighted on the range.

Returning to FIG. 5B, several additional columns are indicated at 198. In some embodiments, the user interface provides a rank graph for each column for which the evaluate function is able to return a meaningful result. In this example, not all columns are displayed the same size. Instead, rank graphs may be moved into the "background" at 198 or into the "foreground" along with graphs 194A and 194B.

The evaluate function can be implemented in any suitable manner. In some embodiments, clicking the "evaluate" tab triggers an analysis of each column in the currently-viewed databook that contains a numerical value. For example, databook 162 includes numerical values for each row for each of the Lab Sq. Ft., Clinical Salary, Univ. Salary, Total Salary, Total Research $, total grants proposed, total awarded, average award, total publications, and tier 1 publications columns. Each qualifying column can be analyzed to determine set-wide statistics, such as mean, average, median, maximum, minimum, and the like. Then, for each column, the value for the row of interest can be compared to the set-wide statistics, and appropriate graphical representations can be rendered. In this example, the results are depicted using bar graphs for a "thermometer" like appearance. However, it should be understood that other graphics and shapes can be used to indicate the results.

Figure 6A:
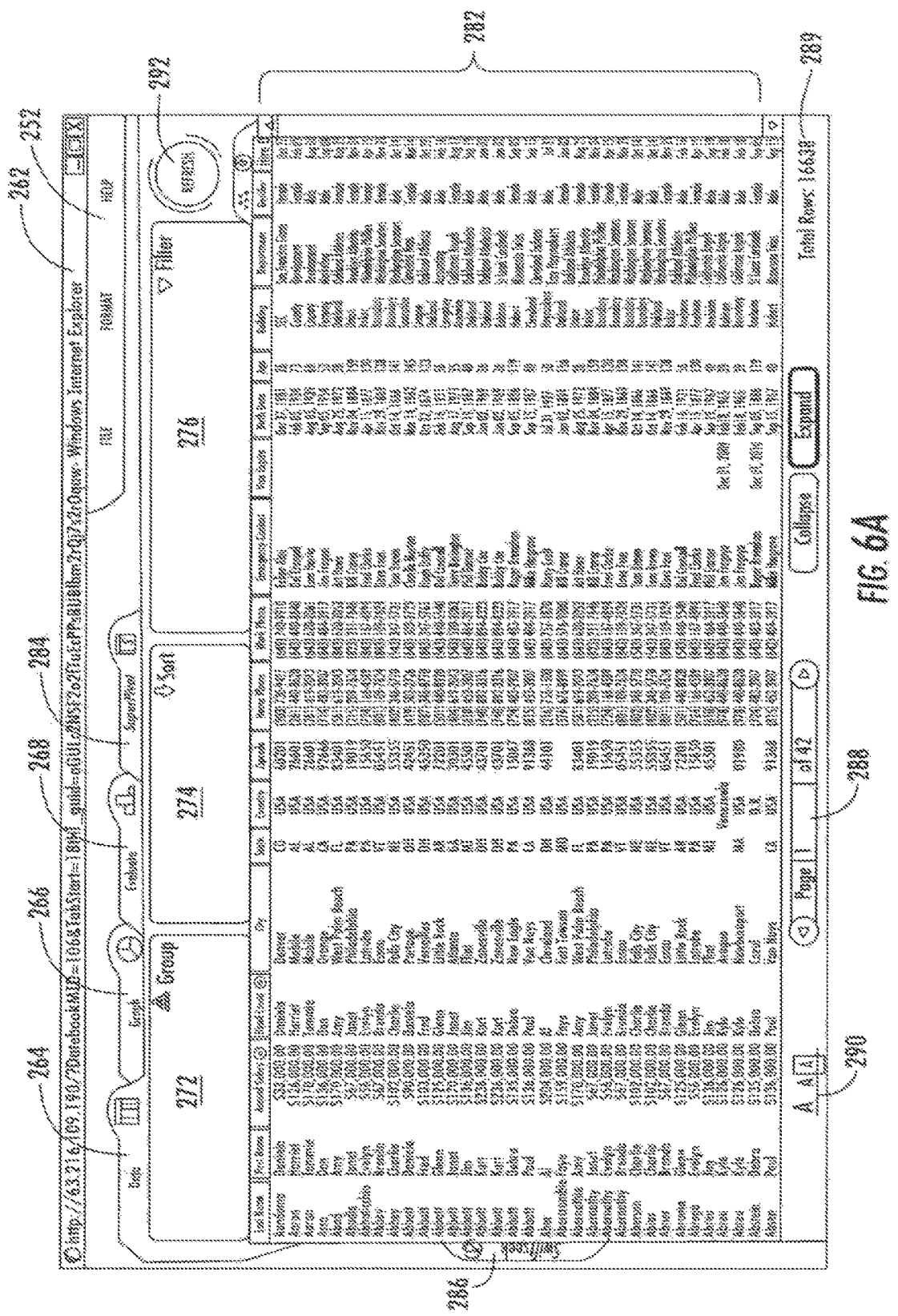
FIG. 6A is a view of a user interface comprising yet another exemplary databook.

FIG. 6A is an example of another databook 262 containing personnel/HR data. Databook 262 features rows 282 and columns 280 of data. In this example, columns 280 include entries as follows: Last Name, First Name, Annual Salary, Headcount (a placeholder for counting records), city, state, country, zip code, home phone, work phone, emergency contact, visa expiration (for some records only), birth date, age, building, department, gender, hire data, and hiring source (not visible in FIG. 6A). For example, databook 262 may originate from a combination of HR and department management data for a university, with the databook being used for administrative purposes. The data in this example is meant to be hypothetical and not to represent any actual data or refer to any actual persons.

Databook 262 includes data tab 264, triggering the current view, graph tab 266, evaluate tab 268, and a "superpivot" tab 284, which can trigger another type of data visualization. Palettes 270 in this example include group palette 272, sort palette 274, and filter palette 276. Contextual menu 252 is included, along with a "refresh" button 292 (since in this example, the databook does not automatically refresh itself). Databook 262 further includes a "swiftseek" tab 286 positioned on its left side, which may be used to rapidly locate one or more rows of interest in the data view, as will be discussed later below. Like databook 162, databook 262 includes zoom in/out control 290, page browsing interface 288, and a total row count indicator 289 (showing a total of 16,638 rows in databook as currently configured).

Figure 6B:
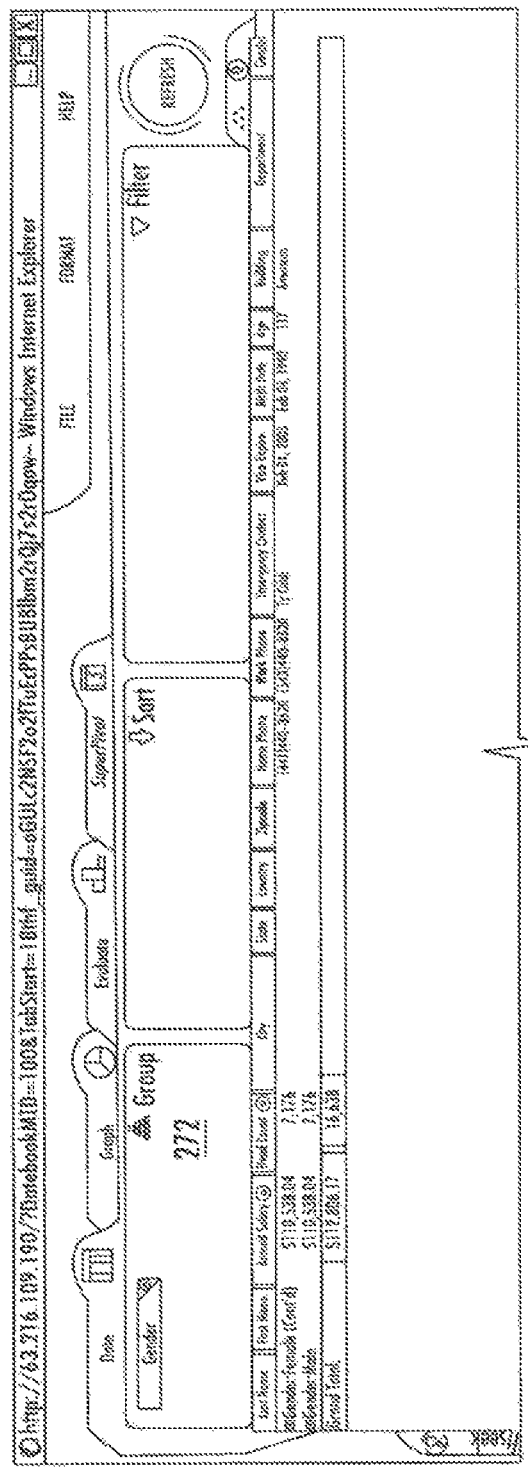
FIGS. 6B-6C illustrate the databook of FIG. 6A with exemplary groupings applied.

Briefly, FIG. 6B shows the result of applying a "gender" grouping to the data. As shown in FIG. 6B, the databook now has grouped the records into "female" and "male." Additionally, the "annual salary" column has been right-clicked to trigger a group analysis—namely to average the salary. Additionally, the "head count" column has been right-clicked to trigger counting each record. Accordingly, the databook now indicates average salary by gender, as well as a total head count for each gender. In this example, the average salary across the entire set has been computed and a total head count provided at "grand total." An interested user could browse the records by expanding either gender list.

Figure 6C:
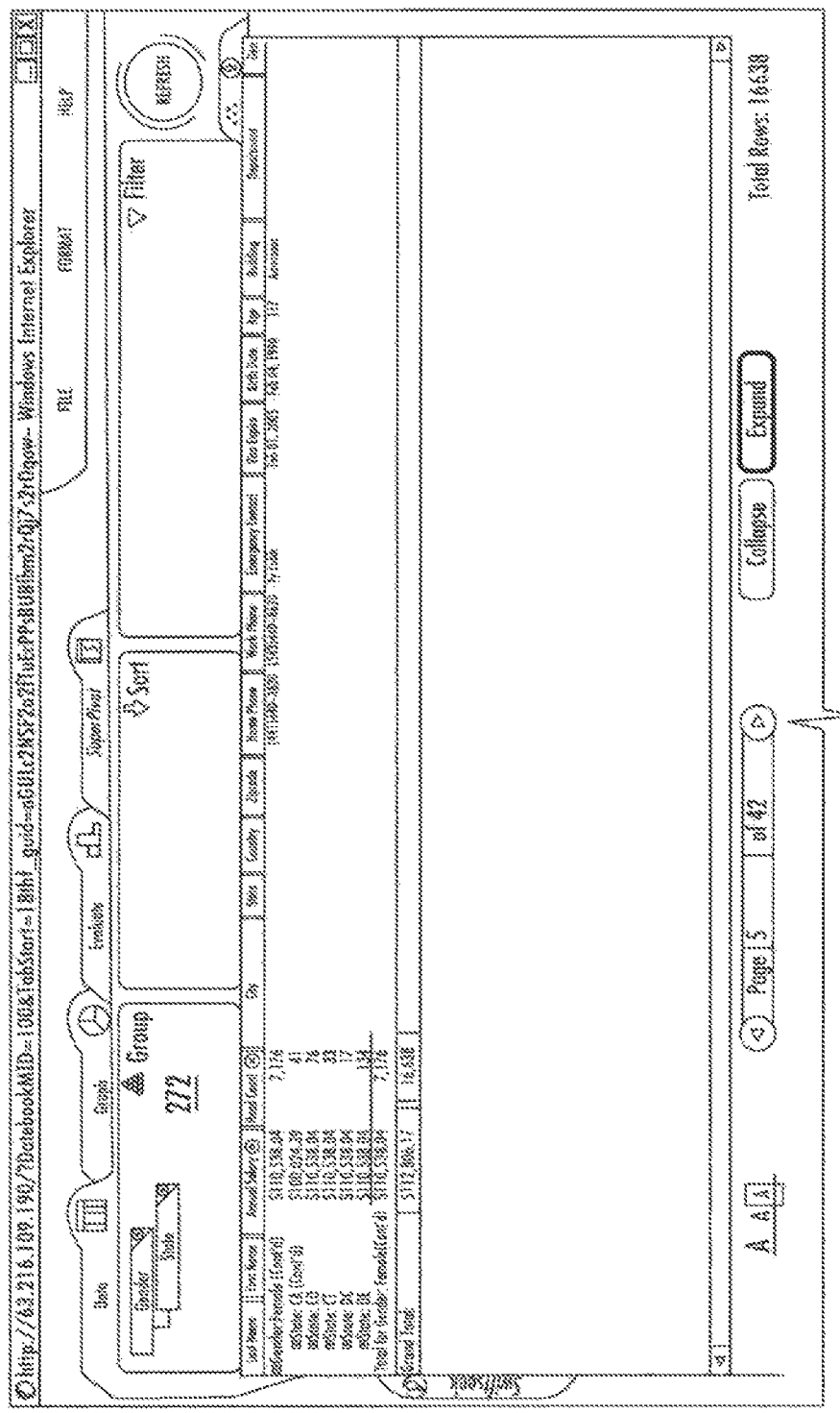

FIG. 6C demonstrates nested grouping functionality that can be supported in some embodiments. In this example, the "gender" grouping has been kept, but the "state" header has been dragged to palette 272 so that, within each "gender" grouping, the results have been grouped by state. Databook 262 now displays average salary and total employees by gender and state. In this example, the average annual salary and head count for female employees in 6 exemplary states are provided. An interested user could drill down to individual records in a particular state by expanding the nested category lists.

Figure 6D:
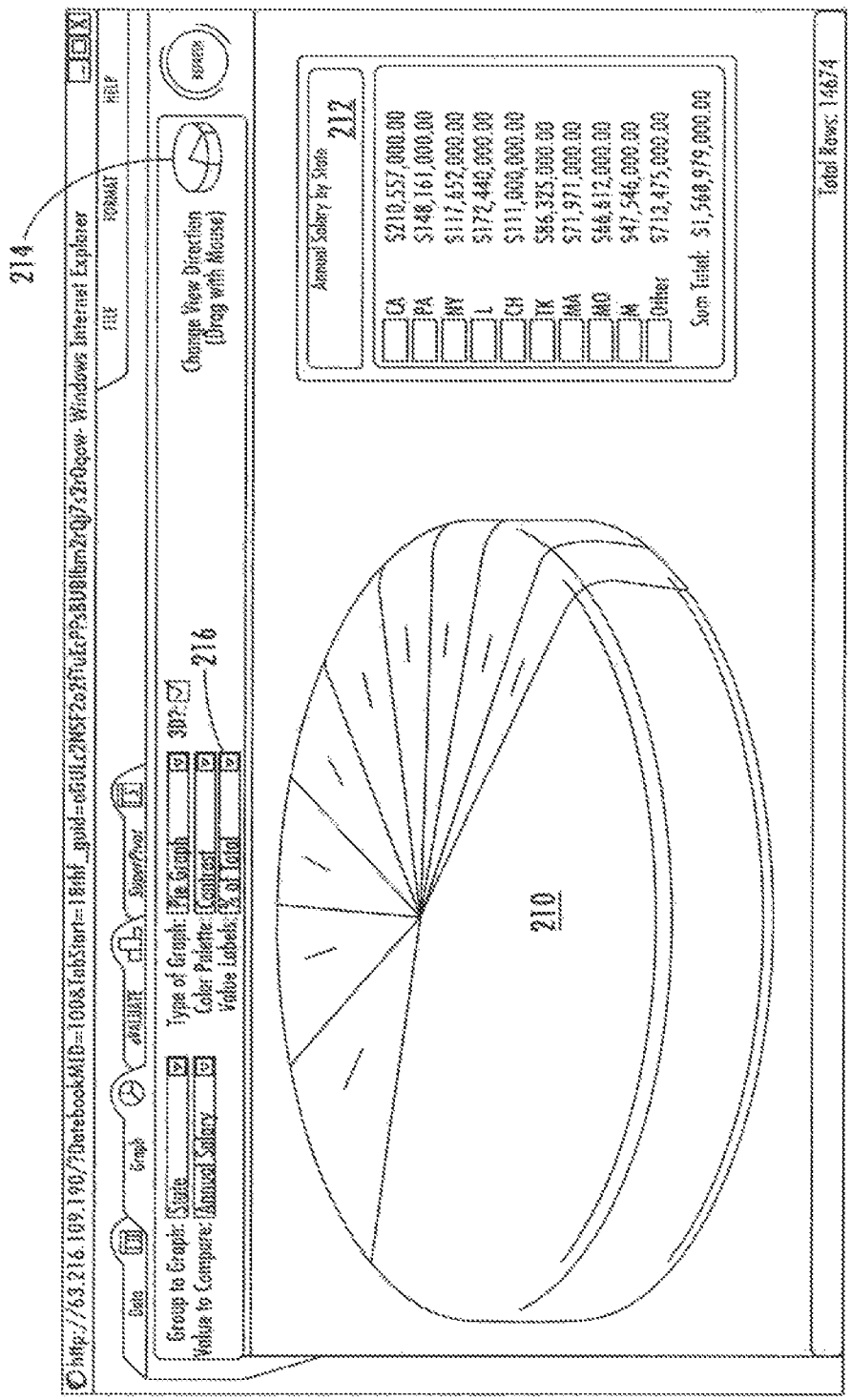
FIG. 6D illustrates an example of data visualization via a databook interface.

FIG. 6D is an example of a graph that can be generated from the databook view of FIG. 6A. In this example, the data is grouped by state and salary is totaled; the previous gender and state groupings have been removed. Pie chart 210 indicates total annual salary by state, with legend 212 indicating which colors correspond to which state. Interface 214 allows a user to rotate or otherwise reposition the pie chart. Preference menus 216 allow the user to specify the underlying data and type of chart. In this example, the menus allow a user to specify which grouping is the basis for the graph, which value to compare between groups, the graph type, the color scheme, and how values are indicated on the graph. The user may also trigger between 2D and 3D effects.

Any suitable graph type can be generated. For example, in addition to pie charts, the software can support line graphs, histograms, donut graphs, and bar graphs of various types and configurations. Generally, the graphs can be based on comparing column values which have been operated upon across a group. For instance, as was noted previously, in some embodiments, a user can select one or more operations to perform on columns within groups, such as summing or averaging values. When a graph is generated, the group-wide result for each group can be presented in visual form.

Figure 6E:
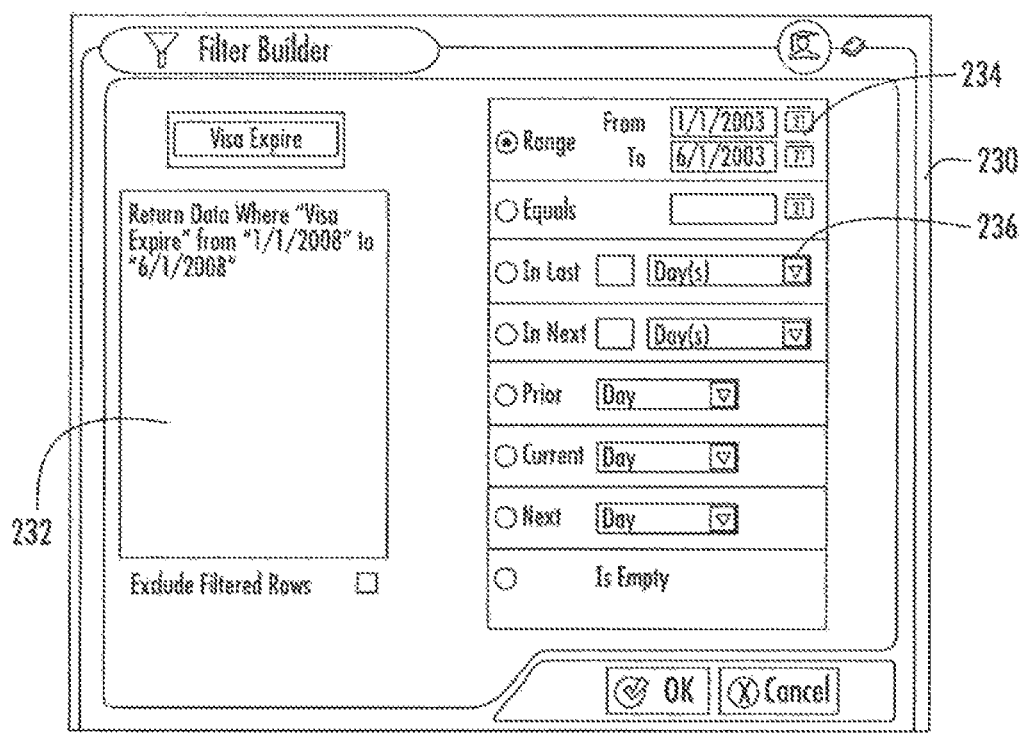
FIGS. 6E-6F illustrate an example of defining and applying a filter to the databook of FIG. 6A.

FIG. 6E presents a detailed example of a contextual menu that may be generated in order to define a filter. In this example, the unfiltered databook of FIG. 6A will be filtered to produce a databook indicating which faculty members have a visa expiration date within a given time range. The user begins by dragging the "visa expire" column to filter palette 276. In this example, the user is presented with filter builder window 234, which provides a plurality of filtering options 236 based on the data type of the column. In this example, the column contains numerical data, namely a date. The user is presented with a range option 230, along with other options ("equals," where a specific date can be provided, "in last" and "in next" options, where the user can indicate a time window in days, weeks, or other time units relative to the current date, "prior, current," and "next" options, where the user can indicate a window about the current date, and "is empty," where the results can be filtered to exclude records with no value for visa expiration). Query area 232 provides the end result of the selection. In this example, the "exclude filtered rows" allows a user to define a filter based on data he/she desires to exclude, rather than include.

The "filter builder" window context will depend on the type of data in the column to be filtered. As another example, non-date numerical data may be filtered by range, value, percentage within the set, and the like. Textual data may be filtered using Boolean operators. In some embodiments, when filtering by textual data, the software provides a pick list based on values of the column. For example, if a filter were being constructed based on "department," the filter builder window could provide a listing of values appearing in the department column of the dataset for easy selection.

Figure 6F:
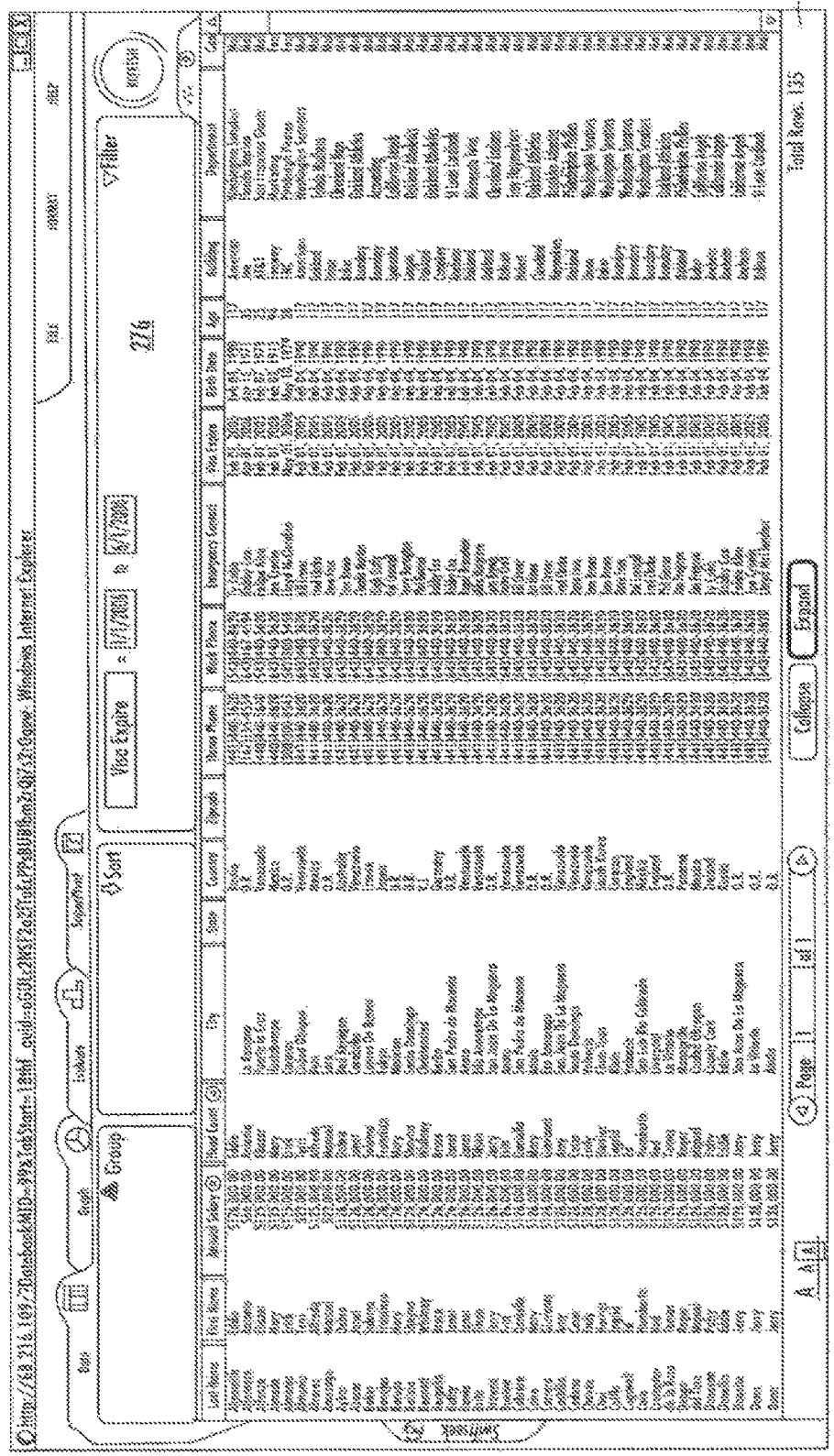

FIG. 6F depicts databook 262 after the filter has been defined and the data refreshed. In this example, as indicated at 289, the total number of rows has decreased to 135 from over 16,000, since not many of the hypothetical employees have visa expirations between Jan. 1, 2008 and Jun. 1, 2008. This report may be useful, for instance, for personnel responsible for coordinating with immigration authorities to ensure the organization's employees remain eligible for employment.

Figure 6G:
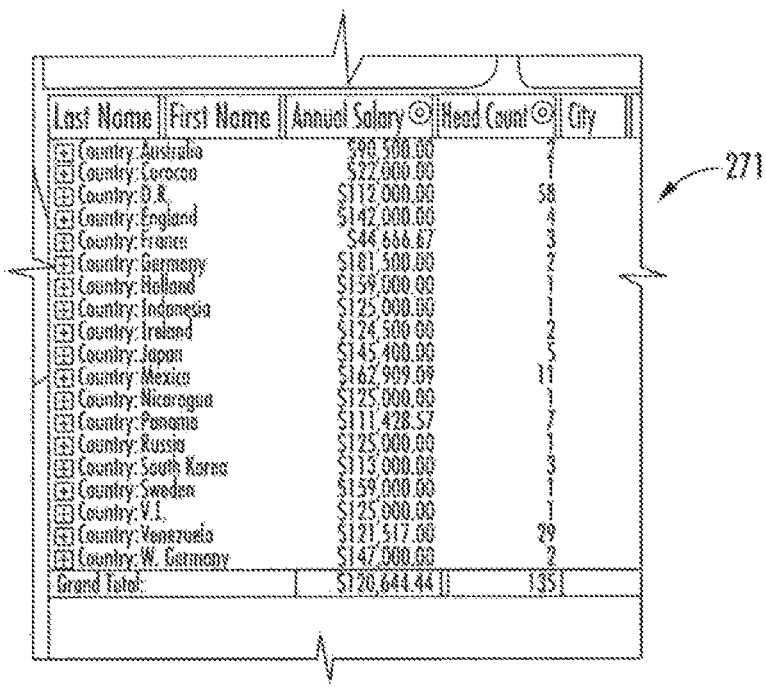
FIG. 6G illustrates aspects of the databook of FIG. 6F with groupings applied.

Additional analysis is demonstrated in FIG. 6G, which depicts a view 271 (showing data only) of databook 262 as filtered in FIG. 6F and further after grouping by country, averaging salary, and performing a count of the "head count" column. For example, if the organization is required to report salary information, this report may be useful. Additionally, if visas are renewed on a country-by-country basis, then the individual visa holders can be identified in turn by browsing the databook using this grouping.

Figure 6H:
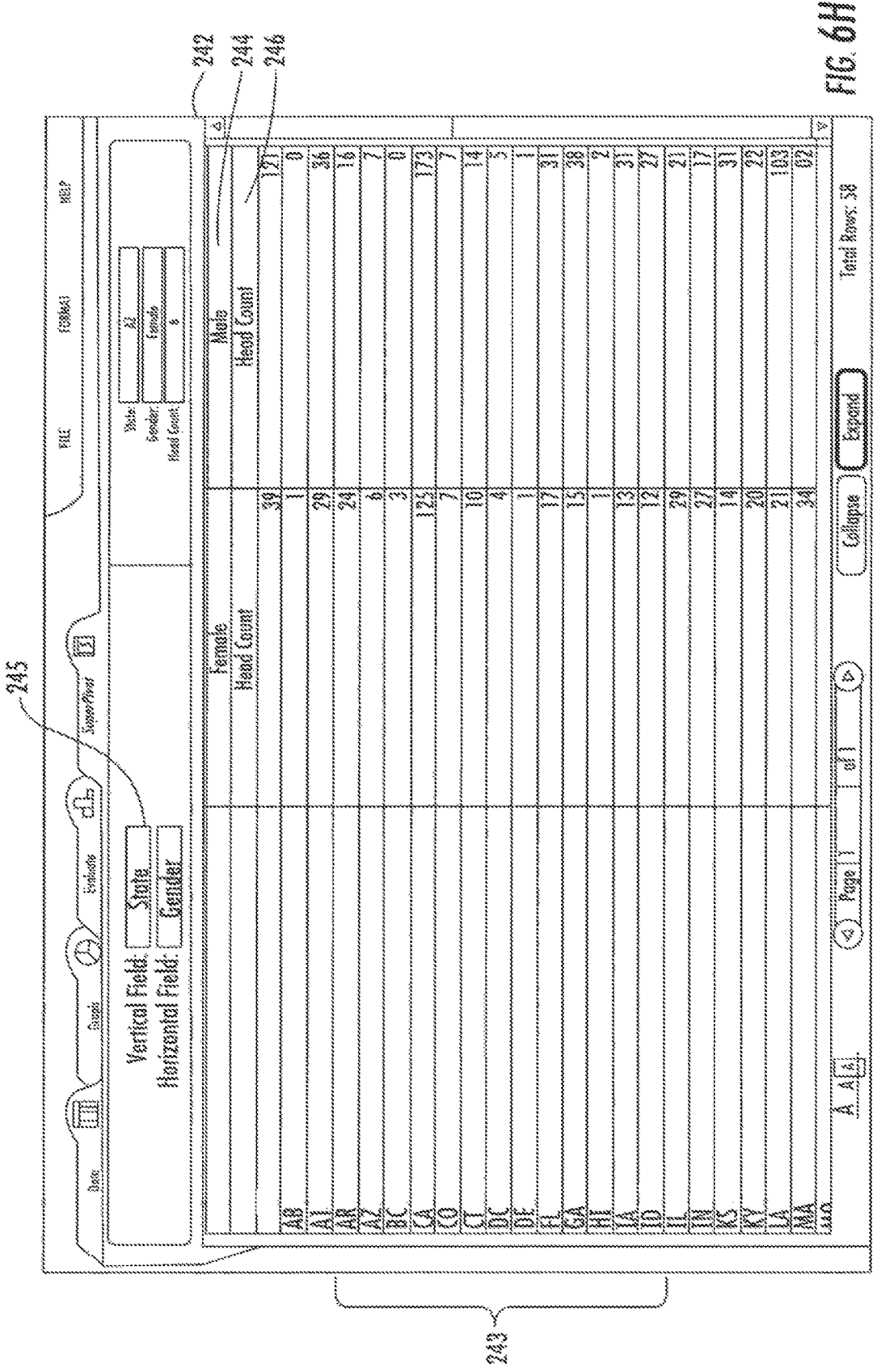
FIG. 6H illustrates an exemplary cross-tabulation view.

FIG. 6H is an example of a cross-tabulation that can be generated based on the current databook view, namely a cross-tabulation of the databook of FIG. 6C where employees were grouped by gender and state, with salary averaged and a headcount provided by summing the "headcount" column in the groups. The cross-tabulation could be triggered by a user applying desired groupings and one or more manipulations (e.g. sum, average, count, etc.) to one or more columns of interest and then clicking the "superpivot" tab 284.

In this example, the cross-tabulation 242 includes totals on the bottom and right side (not visible in FIG. 6H) and groups on the top and left sides.

In this example, groups 242 on the top side are two genders and groups 243 on the left side are several states. The intersection of two groups contains a data point. In this example, the cross-tabulation shows headcount only. For instance, the headcount for females in Arizona is highlighted at the intersection of group "Female" from group 242 and group "AZ" from group 243. The total headcounts for males and females across all states can be viewed at the bottom of the "Male" and "Female" columns. Similarly, the total headcounts for both genders in each state can be viewed at the rightmost end of each row. The cross-tabulation could include interface components allowing for easy selection of the particular groupings or datapoints used—for example, by clicking on the "head count" indicator 246, a user could select other analysis outputs for the groups, or the user could select other groups by changing the contents of the "horizontal field" and "vertical field" display boxes indicated at 245.

Figure 7:
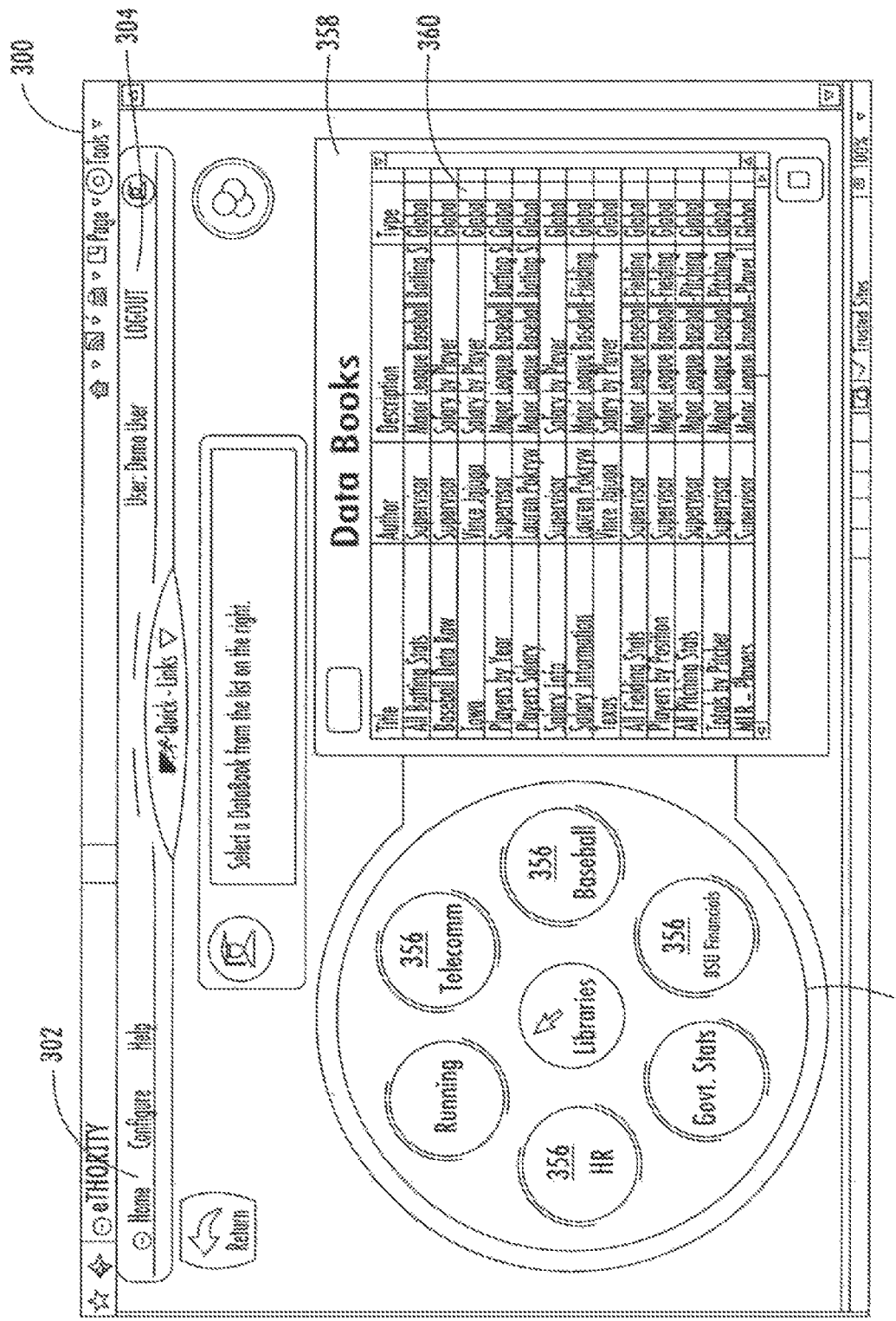
FIG. 7 illustrates another example of a user interface whereby datasets and databooks can be selected.

FIG. 7 depicts another exemplary home screen 300. In this example, home screen 300 includes main command menu 302, including "home," "configure," and "help" options, along with dataset selection area 354 with a plurality of dataset options 356. In this example, selection area 354 rotates so that the selected option 356 is proximate databook listing area 358, and a plurality of databooks 360 based on the selected dataset are provided. Selecting a databook can trigger the databook display such as databooks 62, 162, 262 discussed above or 362 discussed below.

Figure 8A:
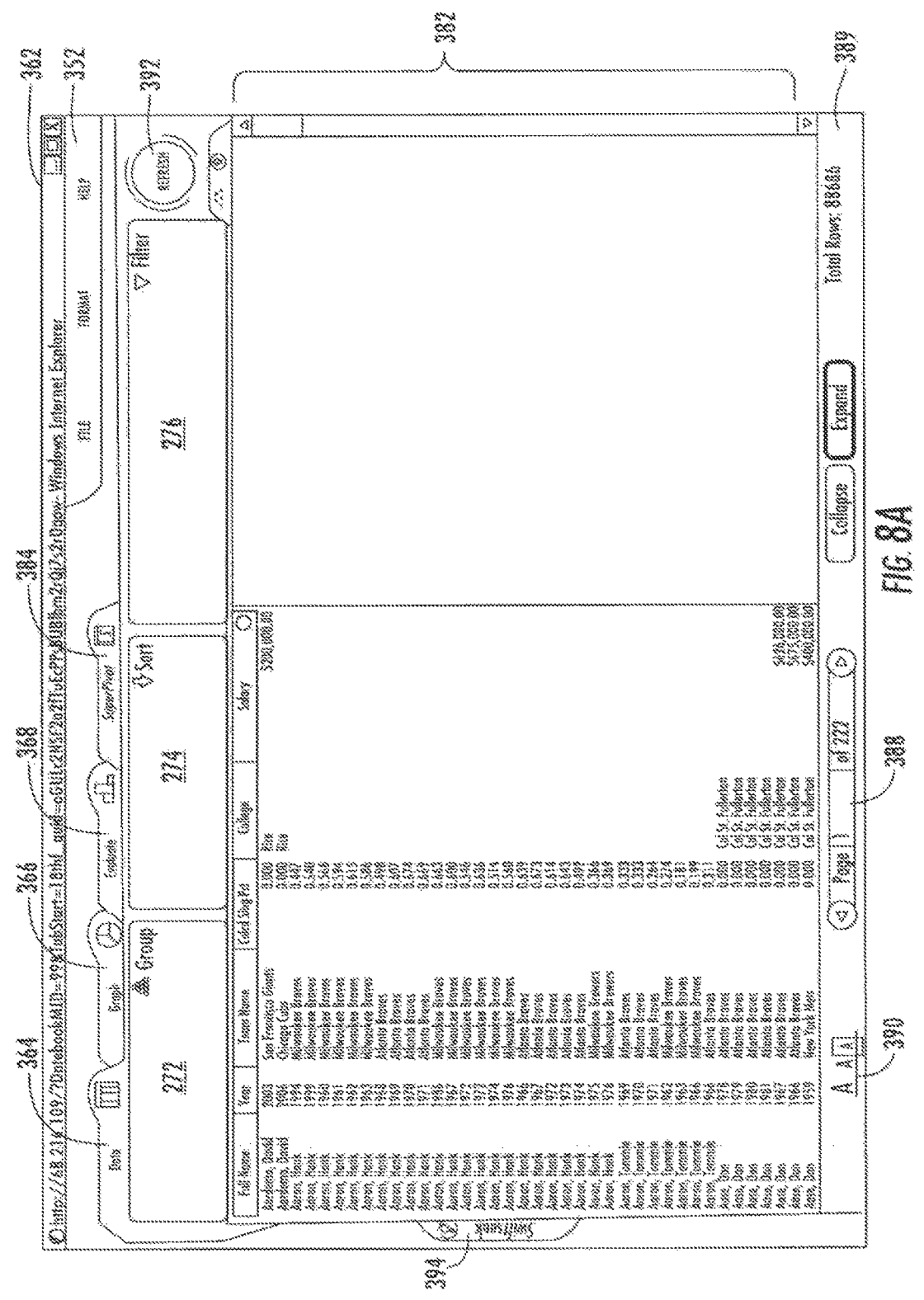

Databook 362 of FIG. 8A includes a plurality of columns 380 corresponding to Full Name, year, Team Name, Calculated Slug Percentage, College, and Salary for a plurality of baseball players. Interface aspects of databook 362 are intended to be the same as those of databook 262 of FIG. 6A, with 300-series numbers used in FIG. 8A to identify analogous features. Of course, the underlying dataset of this example, which is not intended to be accurate, differs from the HR data. In this example, page turning interface 388 indicts that the data spans 222 pages, while row indication 389 shows 88,686 rows of data.

Figure 8B:
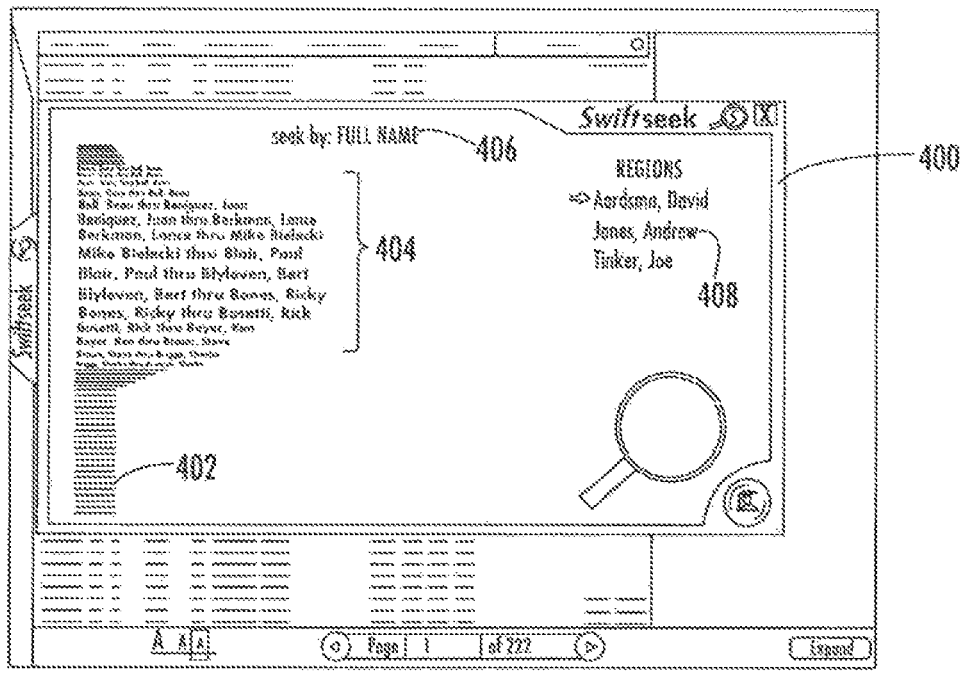
FIG. 8B illustrates an example of a user interface whereby rows in a databook can be rapidly browsed.

Swiftseek tab 386 may be especially useful in light of the volume of data. FIG. 8B shows an example of an interface that may be triggered by a user clicking on a swiftseek tab. Namely, in this example, a window 400 is overlain on databook 362. Column listing 402 shows values from many rows of the "name" column in a visually-compressed (i.e. shrunken) view. However, part of the column is magnified in a "fisheye" effect as indicated at 404. "Fisheye" portion 404 represents the currently-viewed page, and a user can move rapidly through the data by providing suitable input (for example by clicking and dragging the fisheye portion or by mousing over a different portion of list 402).

When the user finishes moving the fisheye portion so that a range of interest is magnified, then the user can provide suitable input indicating the portion of interest, such as by clicking on a mouse or other input device. Then window 400 can be closed, with the databook page updated so that the magnified portion is displayed. In this example, a plurality of regions 408 are also defined. This may be especially advantageous if the rows are so numerous that column listing 402 would be exceedingly small. Instead, the rows of the current databook can be divided into regions selectable within the swiftseek window. In this example, selection area 406 allows the user to specify which column is to be the basis for swiftseek-based page changes.

Although in this example the swiftseek interface is used on unfiltered data, it will be understood that the interface can be used after one or more parameters are applied, such as after filtering, after the data is sorted, and/or after the data is grouped.

Figure 8C:
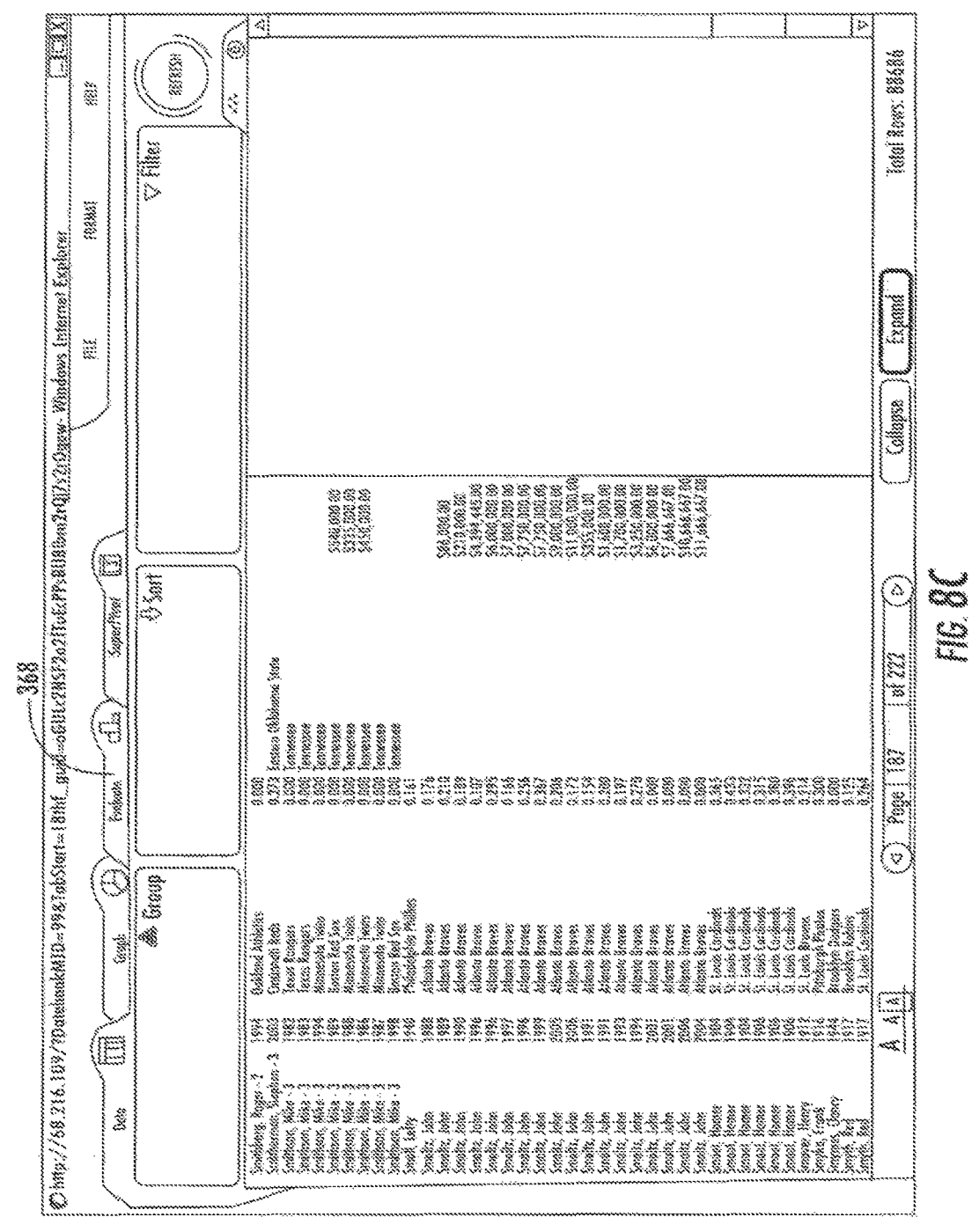

In FIG. 8C, swiftseek has been used (or records have otherwise been browsed) so that a plurality of rows corresponding to records for player "John Smoltz" are visible. In this example, several rows for "John Smoltz" are shown, with each row having a different year, slug percentage, and salary. A user interested in evaluating this player over time can click on "evaluate" tab 368 for an in-depth analysis. For example, a baseball manager may be interested in John Smoltz's salary over time.

FIG. 8D shows the "evaluate" results. In this case, the evaluate function has compared John Smoltz's slug percentage to all other rows. Unless additional grouping or filtering is applied, this particular comparison may not be informative, since the data point for this row is zero (e.g. the dataset may have been empty) as indicated by graph 394A. However, the item of interest, salary, has been compared to the salary value for each of the 88,685 other rows and indicates that Smoltz's salary ranks $156^{th}$ out of the set, putting him above 99% of the records as shown by graph 394B.

The data visualization output (i.e. the "evaluate" output in the above example) can be in any suitable visual form(s). This example featured bar graphs in a "thermometer" visual metaphor, but other embodiments could use other suitable visual metaphors. As another example, the visual metaphor could be based on dials, such as a "salary" speedometer whose dial reading indicates the record's relative position between the top and bottom values in the salary data.

In this example, several records are available over time for the same individual. In some embodiments, the evaluate function can be configured to identify data rows which could be part of trend data. Namely, if a row of interest regarding an individual can be cross-referenced to other rows regarding that individual at different times, a trend analysis is possible. In this example, the evaluate function identified several records for players having an identical name, with each record having a different year and salary value. However, rows could be cross-referenced by other keys, such as employee number or other unique identifiers.

Figure 8E:
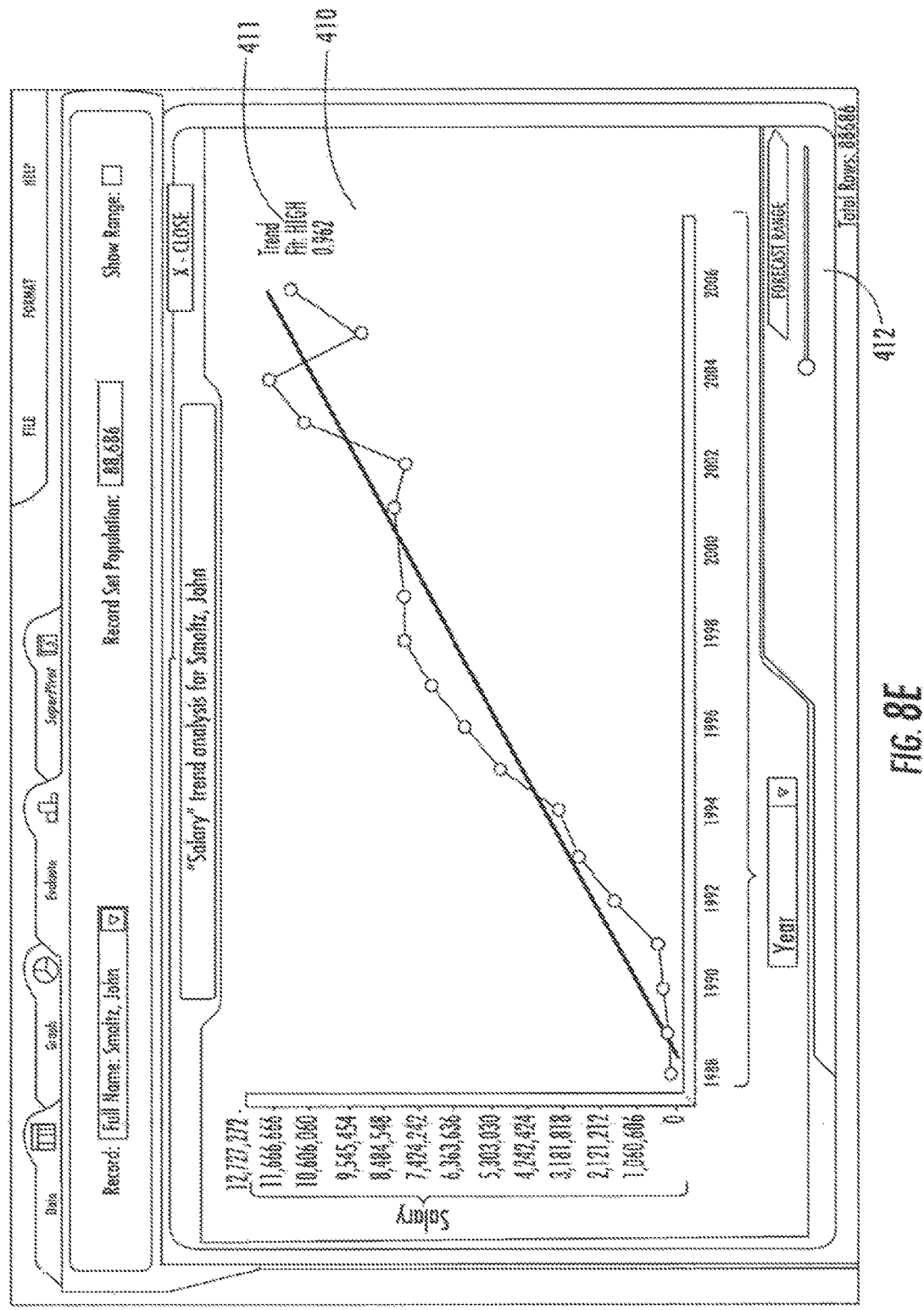

In this example, each graph includes a trend analysis trigger 395. By clicking or otherwise providing input, a user can trigger one or more trend analyses for the column of interest. FIG. 8E shows an example of a trend analysis, namely a trend analysis chart 410 showing salary for John Smoltz over time. Chart 410 includes a trend evaluation indicator 411 which reads "Fit HIGH, r: 0.962" to indicate the confidence in the trend analysis. One of skill in the art will recognize that any suitable number or type of curve-fitting algorithms can be applied to the data to attempt to identify a trend. In some embodiments, the trend analysis output is not made available unless the confidence value meets a predetermined threshold.

Figure 8F:
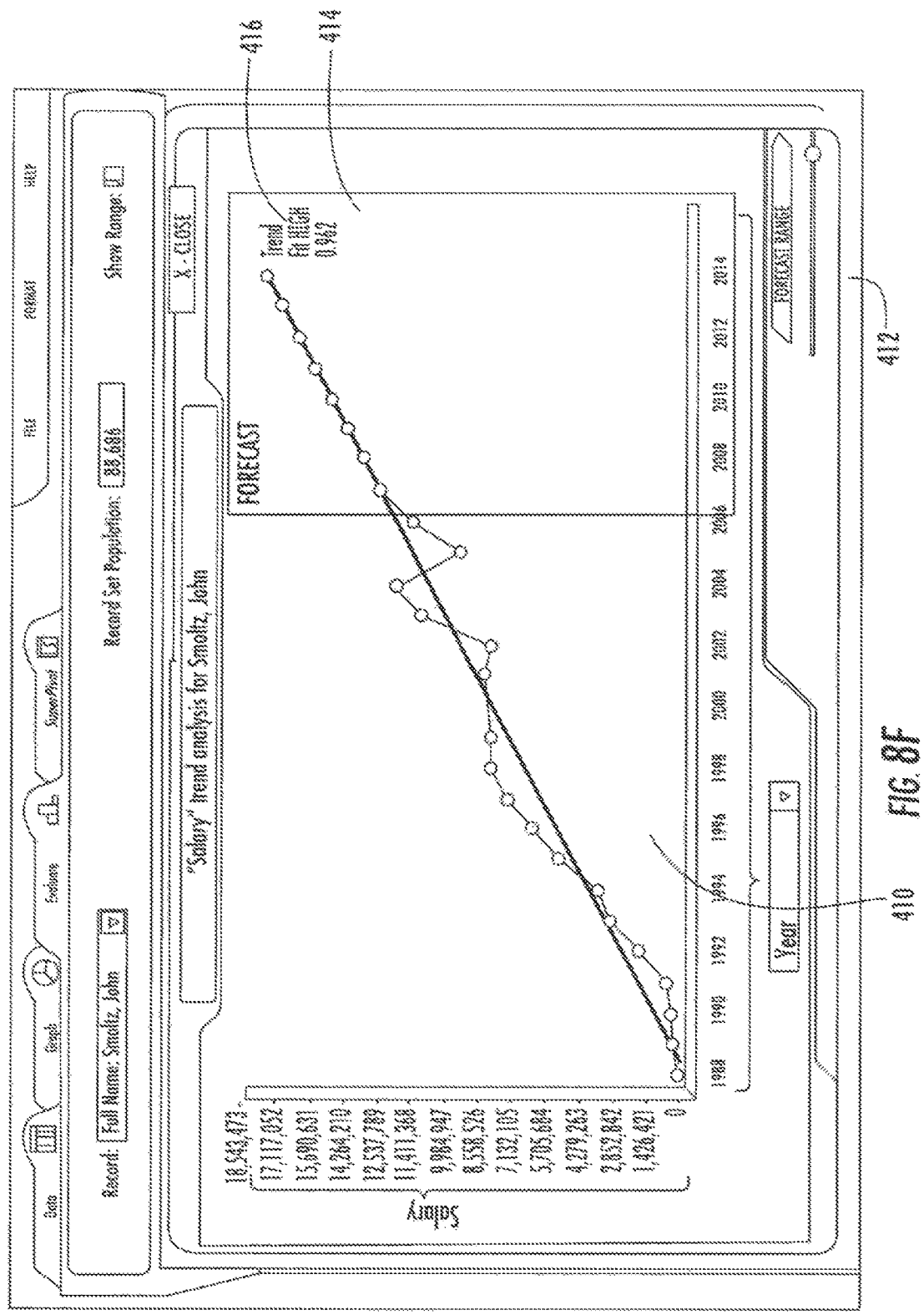

Chart 410 also includes a forecast interface 412, in this example, a slider bar. FIG. 8F shows an example of the chart being extended to the maximum amount based on input provided via the slider bar. As shown at 414, the trend has been continued based on the trend analysis as indicated at 416.

Figure 8G:
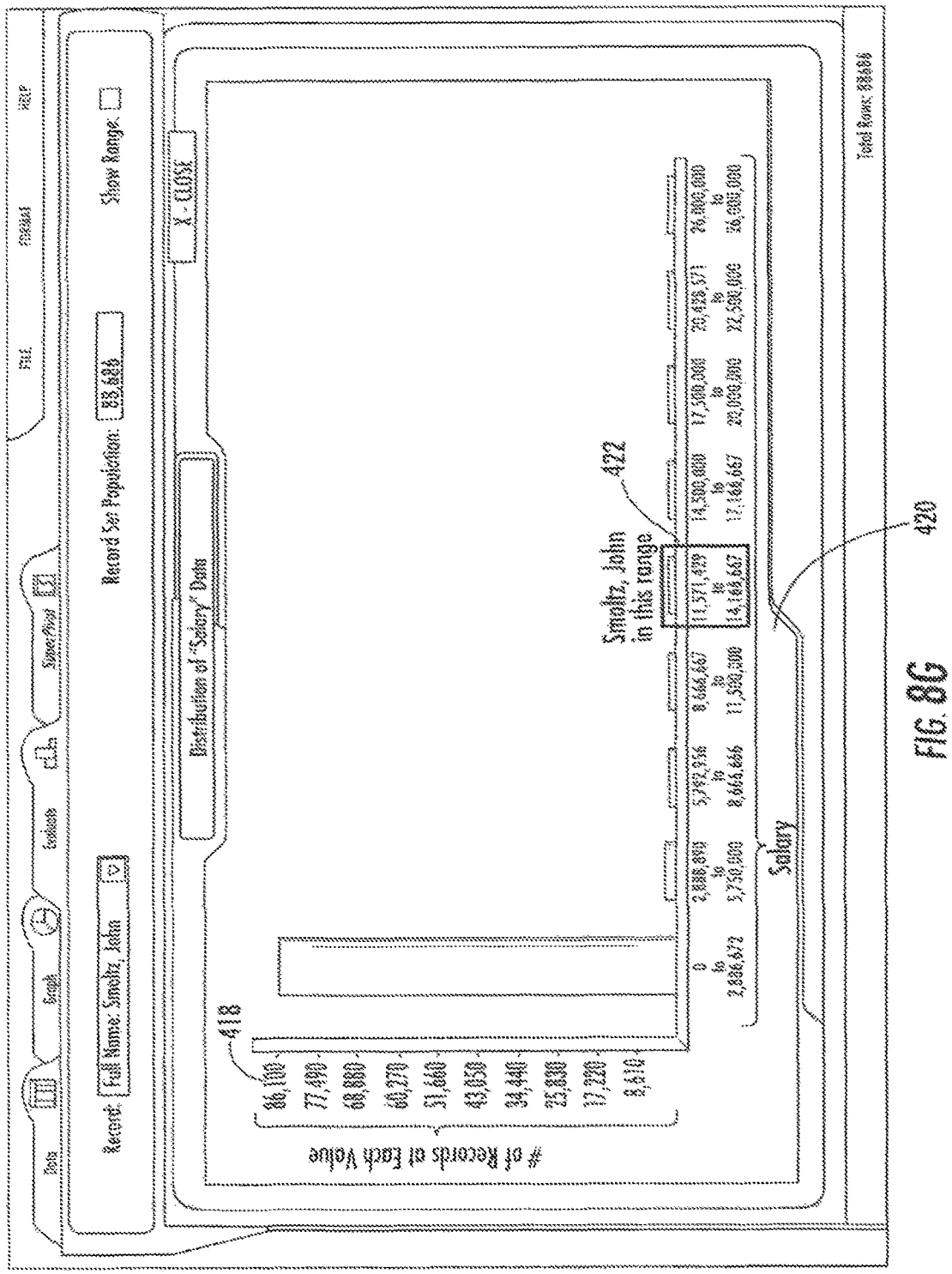

FIG. 8G shows another way in which data can be visualized based on the evaluate function. In this example, salary data is presented as a histogram. The vertical axis 418 indicates the number of records with data in the column of interest that fall within a particular sub-range, with the horizontal axis showing a plurality of sub-ranges in the range of values for the column of interest across the dataset. In this example, as shown at 422, the histogram includes a highlighted portion showing where the record of interest falls in the histogram. In this particular example, about 86,000 records have a "salary" value between zero and 2.8 million. The record being evaluated (John Smoltz for 2004 at $11,677,000) falls within a range of $11,571,429 to $14,166,667. The histogram view may allow for easy identification of whether a particular record is an outlier.

For this particular inquiry, the user may wish to return to the data view and filter out records having a salary below $2.8 million. Then, upon highlighting the same record and again triggering "evaluate," the user can see where the record lies amongst the 200 or so records with high salaries.

Figure 9A:
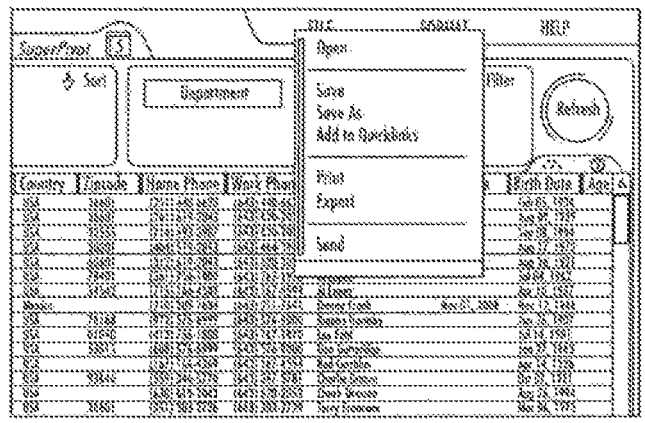
FIGS. 9A-9B illustrate exemplary user interface aspects for saving, exporting, and defining databook contents.

In several of the examples above, the databook includes a "file" and "format" menu. FIG. 9A shows an example of an expanded "file" menu, whereby a user can select options to print, export, send, or save a databook. Additionally, in this example, the user interface allows the user to define "quicklinks" which allow access to a particular databook from a "quicklinks" screen available at any point in the application.

Generally, the currently-viewed databook can be exported in any suitable format. For example, a user may construct a report of interest and then export the report as a PDF file, a spreadsheet (e.g. Microsoft Excel format), or even a text file. The user may additionally or alternatively send the databook to another user or define a link to the databook. Rather than exporting the underlying data, the next user simply views the operational dataset as filtered and operated upon by the parameters specified by the first user using the databook. Additionally, the visualizations of the databook can be printed or otherwise output.

The interface includes "save" and "save as" options. For example, a user can define an entirely new databook and save the databook parameters for later use. In this example, a "new" databook can be defined by specifying one or more operational datasets as the basis of the databook. After the "raw" databook is created, the user can specify filters, groupings, etc.

As another example, a first user may create a databook and provide it to a second user, who changes some of the parameters and uses "save as" to define a new databook by storing the databook definition parameters as a different file.

Figure 9B:
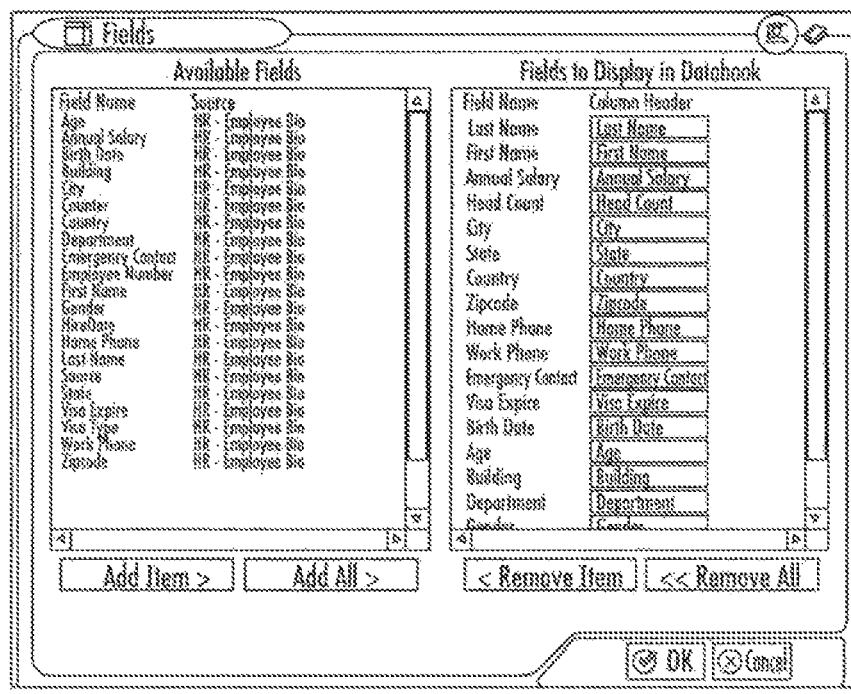

The "format" menu may be used to specify factors such as column width, row height, font, and the like. However, the user may also alter which fields are included in the databook. FIG. 9B shows an example of a field chooser window. In this example, available fields from the operational dataset are shown in a pick list on the left, while fields displayed in the databook are indicated on the right. In this example, the user can also specify how particular columns are labeled.

The field chooser may be especially advantageous for a user who wishes to control the distribution of data. For instance, returning to the simplified databook 62 of FIG. 4, a manager may wish to distribute a listing of the top awards by employees without providing each employee with information about salaries of the top performers. Accordingly, the manager may drag "award" to the filter palette and specify a minimum, or may filter to indicate only the records with an "award" value falling in the top 10%. To avoid sharing the salary information, the manager can go to the "format" menu and remove the "salary" column (and likely the "address") column from view.

Turning now to FIG. 10, a series of examples will be discussed relating to how the underlying data used as the basis for one or more databooks are defined. In contrast to specifying which columns are visible in a databook, the following screens are used to indicate how data is to be extracted and which columns are included in an operational data set.

Figure 10A:
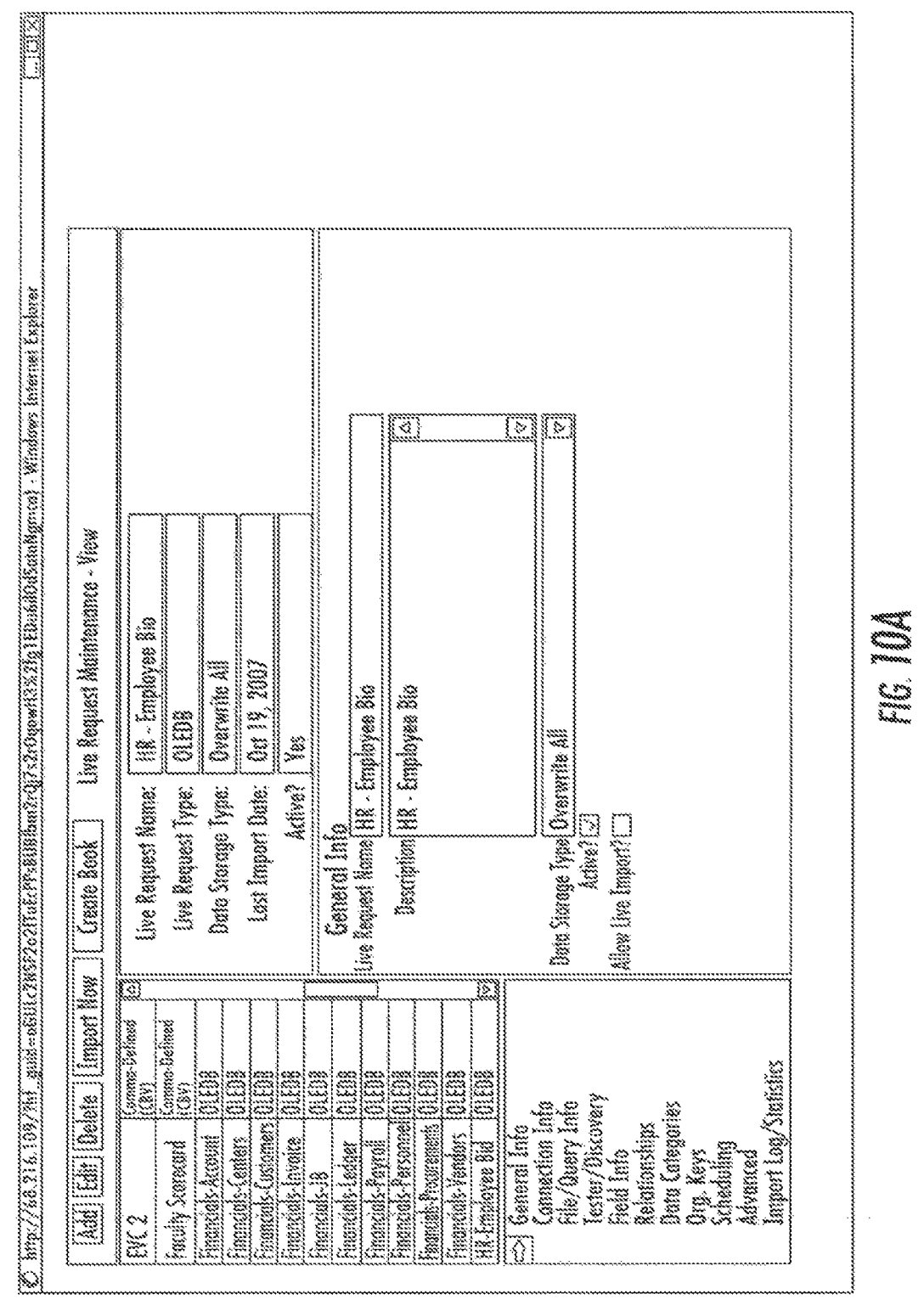

FIG. 10A provides an example of "Live Request Maintenance." In this view, "general" information is displayed, and a user can identify requests by name, type, how data in the operational data set is to be stored, and whether the import is to be "live." Other parameters for the operational dataset include scheduling—for example, in some embodiments, data may be imported for local storage in the operational dataset on a scheduled basis.

A "live" import can be supported in some embodiments in which, instead of extracting data from a data source and bringing the data in the ODS, the data remains in the data source and the solution 10 queries the data source directly based on the configuration parameters. This is advantageous in the scenario where the data source contains a very large volume of data and it is not possible to extract, transform, and load the data into the ODS in a timely fashion. Additionally or alternately, this may be advantageous in the scenario where the data source is collecting data in real-time and the user needs up-to-the-minute reporting capabilities. In this case, copying the data from the data source to the ODS would inject a time-delay in the reporting thereby creating databooks with less than real-time accuracy.

Figure 10B:
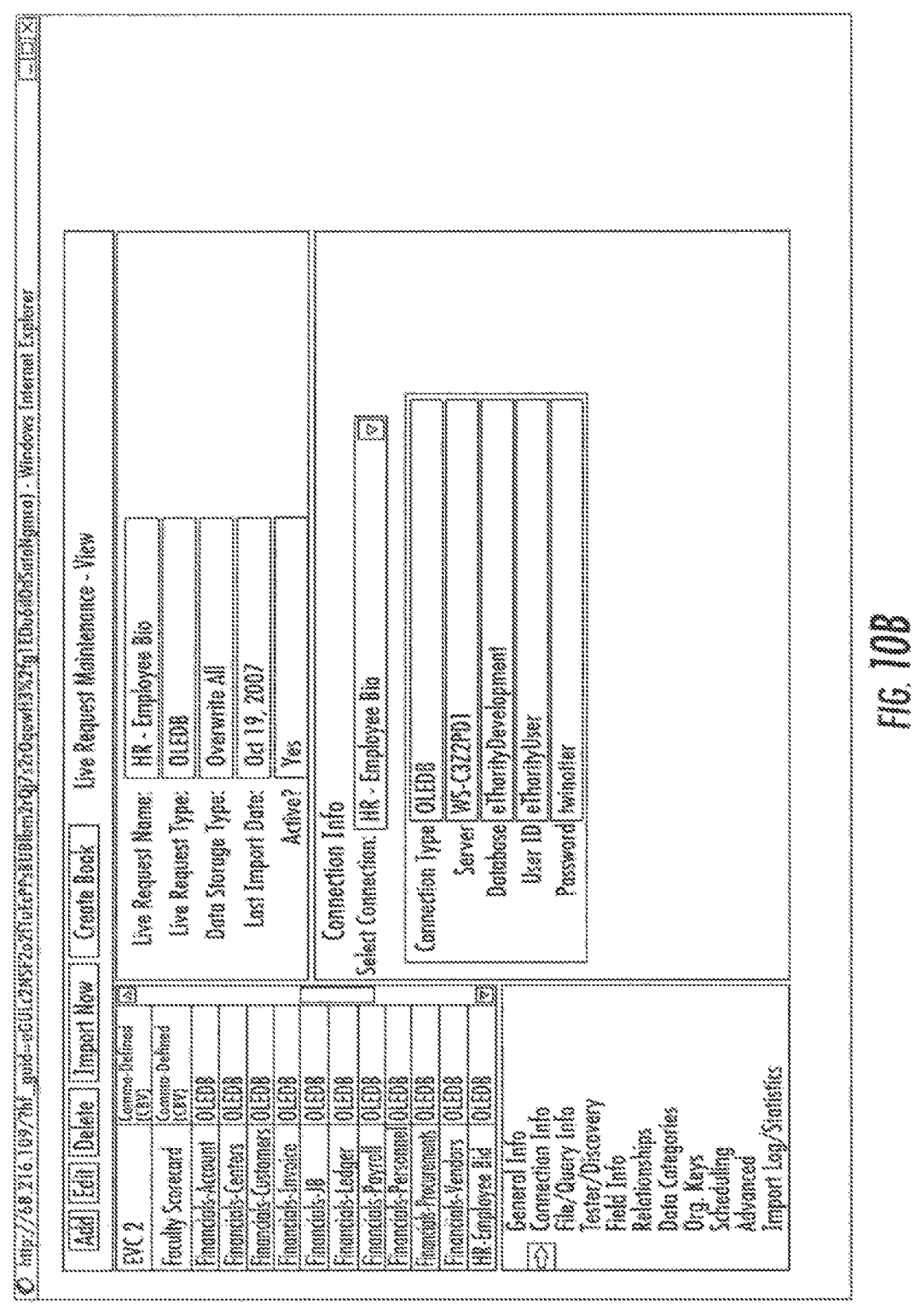

FIG. 10B represents a typical configuration screen where information is provided to the ETL module to indicate how to access a particular data source. In this example, a connection type, server ID, database, user ID, and password are specified. This information is used by the ETL module to gain access to the data source, in this example, a database entitled "eThorityDevelopment" hosted by server WS-C3Z2PD1. For example, the server identification, login, and other information may be part of a script or process that automatically contacts and accesses the data source.

Figure 10C:
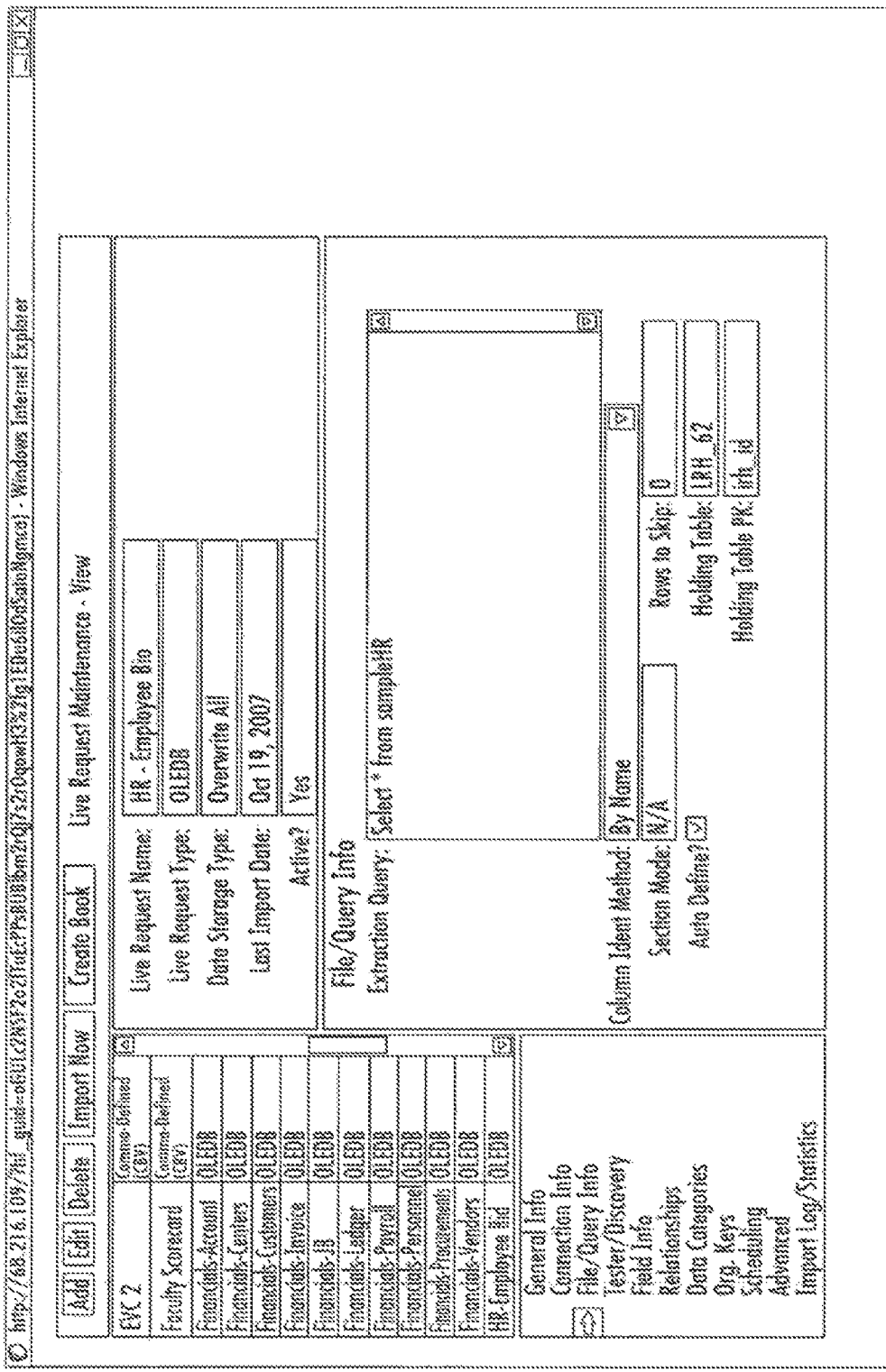

FIG. 10C presents an example of the particulars of extracting data. In this example, the query used is "select * from SampleHR," which should return all entries in the "SampleHR" database. Additional options specify how columns are identified (by name in this example), which rows to be skipped, and "holding table" information indicating where extracted data is stored in the ODS. As noted above, a script, process, or other software component can perform one or more queries to gain access to data of interest.

Figure 10D:
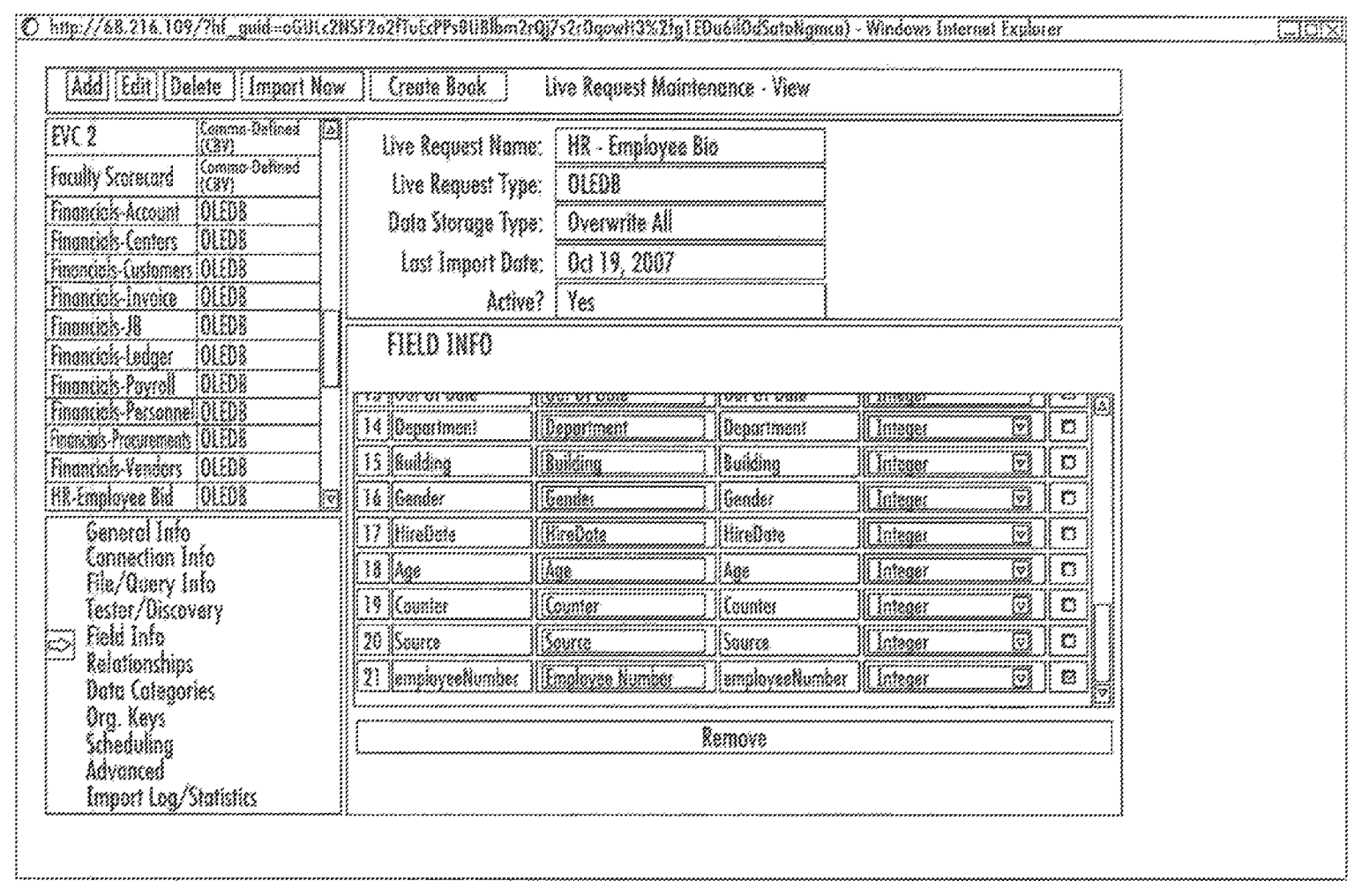

FIG. 10D indicates how columns from a particular data source are to be mapped to columns in the operational dataset. In this example, column names from the data source are correlated to names in the operational dataset and types are indicated. Additionally, one or more columns can be indicated as "keys." One or more components, processes, scripts, or the like can copy information returned from the data source into the operational dataset. Depending upon the configuration parameters, recently-accessed data may overwrite previously-written data in the operational dataset and/or recently-accessed data may be appended to the operational dataset. In some embodiments, data "freshness" is verified by comparing metadata (such as the last update for the operational dataset versus the data source) and only "new" data is written into or appended to the operational dataset.

Figure 10E:
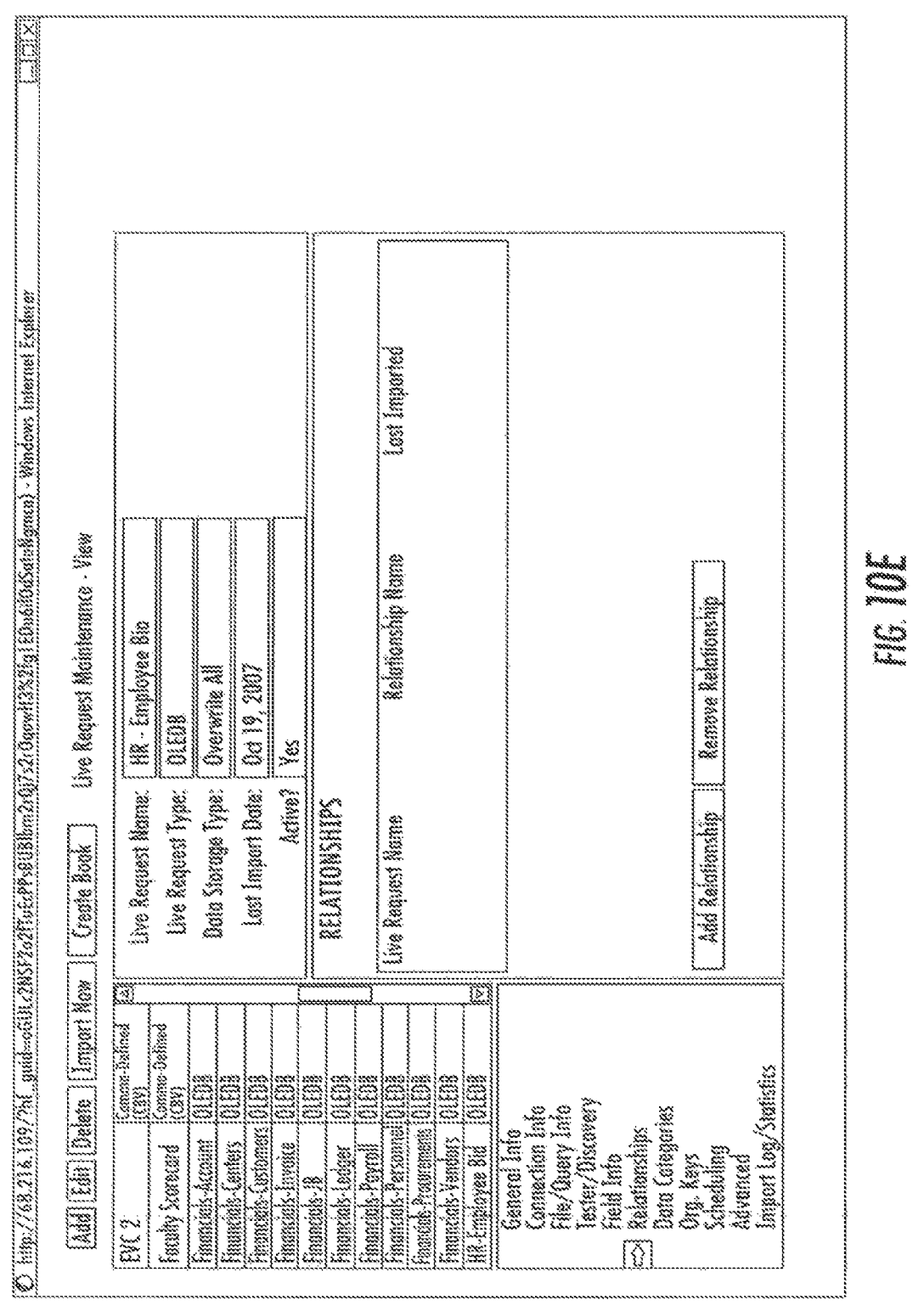

FIG. 10E provides an example of a relationship definition screen. Generally speaking, a live request can be used to access data from a data source for use in an operational dataset, with one or more databooks displaying a subset (or all of) the data from the operational dataset. In some embodiments, relationships can be defined between different live requests so that data from the multiple requests can be integrated. Relationships can be created by associating a column in the current live request with the key in a different live request. For example, suppose you have two live requests: Job History and Person. Job History contains the columns jobTitle, startDate, endDate, and personID and the data represents a list of jobs performed by each employee and the time period they performed the job. Person contains the columns personID, firstName, and lastName and contains data that represents all of the people employed at a company. While the Job History table contains information about which employee held which job during which time period, the employee is represented by some random number, personID. Alone, these two tables may not effectively communicate to the user which user performed which job. By associating the personID column in the Job History table with the personID column in the Person table, the two live requests can be integrated to show the name of the person who performed each job and the time period they during which they performed that job.

As was noted above, some embodiments of solution 10 can include one or more security control policies that restrict what one or more users can see (i.e. access) and do (i.e. permission). FIG. 11 conceptually illustrates access control in accordance with some aspects of the present subject matter. In this example, users A, B, and C each are accessing data from the same operational dataset 500. Specifically, dataset 500 is the basis for databook defined by databook parameters 502. Databook parameters 502 are intended to represent display options, such as row and column visibility, fonts, and the like, and further can include filters, groupings, sort parameters, and other data-shaping inputs.

As an example, databook parameters 502 may represent the filtering and column visibility operations performed by a supervisor A on a databook that is to be distributed for use by supervised employees B, and C. For this example, assume that simplified databook 62 is to be distributed, and is entirely visible to A.

Not all employees need or should be able to view all data in most organizations. For example, if employee B is an administrative assistant to A, then employee B likely only needs access to employee names, department, and addresses. If employee C is in the payroll department, only employee name and salary should be needed. If A distributes databook 62, even with certain columns visible, employees B and C could view prohibited data simply by going to the appropriate formatting or configuration scheme to make the columns of interest visible.

However, the security policy can stop such activity in one or more ways. This is conceptually illustrated by 504 in FIG. 11, which represents application of one or more security policies to data so that each user views a respective databook output 506A, 506B, and 506C. The databook outputs may be the same for some users, may differ for each user, or there may be a degree of overlap in what data is provided to users who have similar access or permissions under the security policy.

Although the security policy is shown "between" the databook parameters 502 and the databooks 506 actually accessed by the users, this is not meant to imply that, in all embodiments, the security policy "filters" data after access based on the databook parameters. Instead, in some embodiments, the security policy may modify the databook parameters before such parameters are applied to access the operational dataset and/or adjust how the parameters are applied so that the users receive access in accordance with their respective rights.

In some embodiments, the software supports Role Based Security Control (RBAC). Security policies that include RBAC are based on assigning each user to one or more roles, with data access and/or permissions based on a role. For example, roles may be associated with restrictions on data columns. Users in a "supervisor" role may have access to data from all columns. Users (such as B) in an "assistant" role may only have access to names, addresses, and non-sensitive data. Users in a "finance" role, such as user C, may have access to salary data, but not necessarily to personal data. For example, the dataset may include much more data than shown in FIG. 4, such as social security number, emergency contact, and the like.

Figure 12:
FIG. 12 is an illustration of three exemplary security control policies relating users to data restrictions.

FIG. 12 includes an example of mapping column access to roles, indicating that users such as B can access name and address only, users C can access salary and name only, while user A can access all data.

In practice, RBAC may be implemented in any suitable way, such as by accessing a policy limiting column availability to certain roles, with each user classified in a role as part of establishing an account (i.e. login, password) for the user. In some instances, it may be advantageous to restrict users from adding prohibited columns to databooks or to define new databooks. In some embodiments, a column may be "present" in a databook, but the RBAC policy may render the data invisible or inhibit display of the data to avoid the need to remove or add columns to a databook based on role. In other embodiments, the RBAC policy adjusts the query made to the operational dataset so that the results that are returned do not include the excluded columns.

A security policy can also support Content Based Access Control (CBAC). In systems that implement CBAC, access to records is based on one or more specific, defined data values. An example of a CBAC policy is shown in FIG. 12. In this example, user D can access only those records where the "Department" column indicates "Finance," while user E can access only those records where the same column indicates "Sales." For example, if user E is in the sales department, then user E likely has no business accessing data from the engineering department. User A, on the other hand, as supervisor, can access records for any department.

In practice CBAC may be implemented by restricting access to rows of data based on one or more parameters. As with RBAC, the restriction may make certain results invisible, or may preclude the data from being returned in the first place in the particular databook as viewed by the user.

A security policy can support hierarchical based security control (HBAC). In HBAC, records are accessible based on the assignment of users within an organization's hierarchy and the assignment of data within the hierarchy. An example of an HBAC hierarchy is shown in FIG. 12. In this example, each user is assigned a level in the hierarchy, and each data column is assigned a level in the hierarchy. Users at a given level can access data at their level and below, but not above. Thus, users B and C may be able to access name and address information, while users D and E may be able to access department sales data, along with name and address information. User A can access all of that information, along with salary and social security number (SSN) and other information.

It will be noted that, if the hierarchy of the HBAC example is used alone, then user C cannot access salary information. In the previous examples, user C required access of salary information as part of his/her job. In that same job is assumed for C in this example, it is clear that an exception should be made to the security policy.

In some embodiments, the security policy can support exceptions. For example, exceptions may be defined on a user-by-user basis for particular records, columns, or both. For example, user C may be maintained at level 3 in an HBAC system, but may have an exception so that user C can view salary information. The exception may be further limited so that only particular records, such as current salary, are available. For example, returning to FIG. 4, user Sue E. has several records corresponding to different salaries. This can represent, for instance, several salary records for different years. User C may be restricted to viewing only the current salary record unless user C has some need to view salary histories.

The security policy may include a combination of RBAC, CBAC, HBAC, and/or other access control schemes. For example, in the HBAC scheme of FIG. 12, both users D and E appear to have access to all "department sales" data. This HBAC scheme may be combined with CBAC principles so that users D and E have access only to all "department sales" data for their respective departments.

In some embodiments, the system functions so that security policies ensure that data is not inadvertently revealed via other visualizations. As a simplified example, in some embodiments, a databook with one or more groupings based on one column value may analyze one or more column values across the groups. In some embodiments, the solution also provides a "grand total" across all groups. For example, a sales reporting databook may group sales by department and provide a department total, along with a total for all records. If the sales report databook is distributed to different department heads, the department heads may be restricted from viewing records outside their own department by the security policy. A higher-level user may have access to both groupings.

The security policy (or policies) can be implemented in any suitable way, and may be, for example, a combination of data access restrictions and different permissions for users based on the policy. In some embodiments, security policies are implemented as adjustments to queries on the dataset, with the adjustments based on the policy. For example, a policy restricting access to records to a user's department may be implemented as an by appending terms to the query requiring the "department" value of returned records to match the user's department.

In some embodiments, as far as the first department head is concerned, the databook "contains" only information from his/her department, so the "grand total," even if displayed, will be limited to his/her department. This may be the case, for example, if the security policy (or policies) are implemented as restrictions on what queries are actually performed for certain users and/or adjustments to queries performed for certain users.

However, if the security policy is implemented so that prohibited items are included in the databook, but are invisible, the security policy may further extend to inhibit display of the grand total so that, for example, a first department head cannot "work backwards" from the grand total to find out details of his or her cohorts. For example, the security policy can explicitly restrict analysis outputs if one or more inputs include prohibited values.

In some embodiments, the security policy includes user permissions regarding databook definition parameters. For example, the security policy may prevent a user from changing a filtering, grouping, or sorting parameter, or may prevent the user from adding or removing columns to or from a databook. Access restrictions may extend to other configuration parameters, such as which users can view/ change live request specification data such as database identifiers, relationships, login information, and the like.

In some embodiments, users can define security policy parameters for other users. For instance, a user with a set of access rights may further limit access to a databook when distributing the databook to other users; generally, the user should not be allowed to add access rights the user himself does not possess. Rights defined in a HBAC, CBAC, RBAC, or other security policy may be "nested" so that users at a given level or role, for example, can define more restrictive security policies for users at lower levels or roles "below" the given role.

Returning briefly to FIG. 11, another conceptual aspect of the present subject matter can be appreciated. Operational data set 500 comprises a plurality of rows and columns. As was noted before, the dataset can originate from one or more sources. The data set may be updated irregularly based on user commands, on a scheduled basis, or even in response to an indication that an underlying data source has changed.

Because the databooks are defined by parameters 502, the access controls (and databooks) do not need to be redefined every time the underlying data sources change. For example, in a large manufacturing enterprise, sales records may be updated daily, with the operational dataset constantly including more records. A manager may be interested in which salespeople in each state are in the top 10% of total sales for the year. The manager can construct a databook, such as by grouping sales figures by state and salesperson, with sales amount totaled and the results filtered to show only the top 10% of sales.

The databook can then be accessed at any time and (assuming the operational dataset is updated), the report will automatically be updated with the latest data when the databook is refreshed. Databook definition parameters can be provided to various users to share the databook. As was noted above, if one or more security policies are in effect, the users may access the operational dataset using the same databook definition parameters, but end up with different databooks depending upon access rights and/or permissions.

As was noted above, some embodiments of business intelligence/data mining software solutions can combine data from multiple sources into a single operational dataset. The operational dataset can be the basis for one or more databooks which act as both a user interface and data reporting mechanism. In contrast to at least some previously-proposed business intelligence/data mining solutions, solutions constructed in accordance with the present subject matter are the result of recognizing significant user interface challenges associated with such previous systems. Such systems generally fail to provide optimal user interfaces, and are generally cumbersome for a decisionmaker, especially one with limited technical knowledge, to use.

The visual effects and interfaces can be provided using any suitable programming techniques or tools known to one of skill in the computer arts. As was noted above, some user interface aspects are implemented in FLASH. However, regardless of the underlying UI, the databook interface can be constructed using any suitable application development tool or tools. The operational dataset can be managed using any suitable database type, such as an SQL database. In some embodiments, the operational dataset is managed as an SQL database, and drag-and-drop interactions with the palettes are used to define SQL queries to obtain results that correspond to the user input. For example, filtering may correspond to construction of "WHERE" clauses for SQL queries on the dataset.

The ETL module, security control policies, and other architectural components can be implemented as scripts, processes, standalone applications, or may be part of one composite application that also provides the user interface aspects. For network-based implementation, the system can include suitable networking components, such as a web server application or other suitable support for the communication protocols to be used.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer, for instance.

The various computer systems discussed herein are not limited to any particular hardware architecture or configuration. Embodiments of the methods and systems set forth herein may be implemented by one or more general-purpose or customized computing devices adapted in any suitable manner to provide desired functionality. The device(s) may be adapted to provide additional functionality complementary or unrelated to the present subject matter, as well. For instance, one or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to application-specific circuits. Of course, combinations of computer-executed software and hard-wired logic or other circuitry may be suitable, as well.

Embodiments of the methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter. Additionally or alternatively, the computing device(s) may comprise circuitry that renders the device(s) operative to implement one or more of the methods of the present subject matter.

Any suitable computer-readable medium or media may be used to implement or practice the presently-disclosed subject matter, including, but not limited to, diskettes, drives, and other magnetic-based storage media, optical storage media, including disks (including CD-ROMS, DVD-ROMS, and variants thereof), flash, RAM, ROM, and other memory devices, and the like.

The present disclosure also makes reference to the relay of communicated data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

In several examples above, the operational dataset, data sources, databases, and the like were described by reference to rows and columns. Generally speaking, a row contains one or more fields, with each field corresponding to a column. Rows may alternatively be referred to as "records" as well.

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

The invention claimed is:

1. A data visualization method, comprising:
providing a databook interface to a user;
identifying a security control policy associated with the user;
querying an operational data set based on a databook definition parameter and returning data results from the operational data set in response to the query, the data results from the operational data set including data from separate source systems using different data formats;
determining, prior to displaying the returned data results, that the security control policy prohibits the user from accessing a first subset of the returned data results and that the security control policy allows the user to access a second subset of the returned data results, the second subset of returned data results including data from the separate source systems;
updating the databook interface to display results of the query, wherein updating the databook interface comprises:
hiding the first subset of the returned data results so that the first subset of the returned data results are prevented from being displayed via the databook interface, and
adding interface objects to the databook interface that provide a common format for displaying the second subset of the returned data results, and
providing the updated databook interface to the user;
determining that rows of data will span multiple pages and dividing the rows for display on the multiple pages; and
rendering a row browsing interface in response to a user command, wherein the row browsing interface comprises (i) a visually-compressed view of the fields of at least one column for at least some of the rows that would otherwise be displayed on the multiple pages and (ii) a magnified view area, wherein a selection of the magnified view area causes an increase in a size of a first portion of the visually-compressed view while the size of a second portion of the visually-compressed view remains unchanged and still visible,
wherein, in response to a user input provided after a selection of a portion of the visually-compressed view, a data display area of the databook interface is updated to select the page containing the rows in the selected magnified view area.

2. The method of claim 1, wherein determining that the security control policy prohibits the user from accessing the first subset of the returned data results comprises:
   accessing a content-based security control parameter in the first subset of the returned data results; and
   determining that the content-based security control parameter has a value indicating that the user lacks access rights to the first subset of the returned data results.

3. The method of claim 2, wherein the content-based security control parameter is included in a column in the first subset of the returned data results and wherein rows with the value of the content-based security control parameter are hidden from the user in the updated databook interface.

4. The method of claim 1, wherein the security control policy comprises a role-based security control policy and wherein determining that the security control policy prohibits the user from accessing the first subset of the returned data results comprises:
   accessing data describing a role of the user in a set of predefined roles;
   identifying roles the set of predefined roles that are allowed access to the first subset of the returned data results; and
   determining that the role of the user is not included in the roles that are allowed access to the first subset of the returned data results.

5. The method of claim 1, wherein the security control policy comprises a hierarchical-based security control policy,
   wherein determining that the security control policy prohibits the user from accessing the first subset of the returned data results comprises identifying a position of the user in a predefined hierarchy and determining that the position of the user in the predefined hierarchy is insufficient to allow access to the first subset of the returned data results.

6. The method of claim 1, wherein the first subset of the returned data results is hidden without hiding columns of the databook interface.

7. The method of claim 1, wherein the databook interface includes at least a group, sort, and filter palette whereby definition parameters for grouping the rows of data, sorting the rows of data, and filtering data from the operational dataset can be specified, respectively.

8. The method of claim 1, wherein the databook interface includes a graphical selection feature for specifying one of a plurality of views, the plurality of views further including:
   a graph view rendering at least one graph based on at least some rows and columns of data from the operational data set.

9. The method of claim 1, wherein the operational data set is maintained in memory of at least one computing device, and further comprising:
   accessing a plurality of data sources stored in memory separate from the memory in which the operational dataset is maintained; and
   copying data from the accessed data sources into the operational dataset.

10. A system comprising:
    a processing device; and
    a memory device communicatively coupled to the processing device, the processing device being configured to execute instructions stored in the memory device to cause the processing device to:
    provide a databook interface to a user,
    identify a security control policy associated with the user,
    query an operational data set based on a databook definition parameter and return data results from the operational data set in response to the query, the data results from the operational data set including data from separate source systems using different data formats,
    determine, prior to a display of the returned data results, that the security control policy prohibits the user from accessing a first subset of the returned data results and that the security control policy allows the user to access a second subset of the returned data results, the second subset of returned data results including data from the separate source systems, and
    update the databook interface to display results of the query, wherein updating the databook interface comprises:
    hiding the first subset of the returned data results so that the first subset of the returned data results are prevented from being displayed via the databook interface, and
    adding interface objects to the databook interface that provide a common format for displaying the second subset of the returned data results, and
    providing the updated databook interface to the user,
    determine that rows of data will span multiple pages and dividing the rows for display on the multiple pages,
    render a row browsing interface in response to a user command, wherein the row browsing interface comprises:
    a visually-compressed view of the fields of at least one column for at least some of the rows that would otherwise be displayed on the multiple pages, and a magnified view area that is configured to respond to a selection by causing an increase in a size of a first portion of the visually-compressed view while the size of a second portion of the visually-compressed view remains unchanged and still visible, and
    update, in response to a user input provided after a selection of a portion of the visually-compressed view, a data display area of the databook interface to select the page containing the rows in the selected magnified view area.

11. The system of claim 10, wherein the processing device is configured to determine that the security control policy prohibits the user from accessing the first subset of the returned data results by performing operations comprising:
    accessing a content-based security control parameter in the first subset of the returned data results; and
    determining that the content-based security control parameter has a value indicating that the user lacks access rights to the first subset of the returned data results.

12. The system of claim 11, wherein the content-based security control parameter is included in a column in the first subset of the returned data results and wherein the processing device is configured to hide rows with the value of the content-based security control parameter from the user in the updated databook interface.

13. The system of claim 10, wherein the security control policy comprises a role-based security control policy and wherein the processing device is configured to determine that the security control policy prohibits the user from accessing the first subset of the returned data results by performing operations comprising:
  accessing data describing a role of the user in a set of predefined roles;
  identifying roles the set of predefined roles that are allowed access to the first subset of the returned data results; and
  determining that the role of the user is not included in the roles that are allowed access to the first subset of the returned data results.

14. The system of claim 10, wherein the security control policy comprises a hierarchical-based security control policy,
  wherein the processing device is configured to determine that the security control policy prohibits the user from accessing the first subset of the returned data results by performing operations comprising:
    identifying a position of the user in a predefined hierarchy, and
    determining that the position of the user in the predefined hierarchy is insufficient to allow access to the first subset of the returned data results.

15. The system of claim 10, wherein the processing device is further configured to hide the first subset of the returned data results without hiding columns of the databook interface.

16. The system of claim 10, wherein the databook interface includes at least a group, sort, and filter palette whereby definition parameters for grouping the rows of data, sorting the rows of data, and filtering data from the operational dataset can be specified, respectively.

17. The system of claim 10, wherein the databook interface includes a graphical selection feature for specifying one of a plurality of views, the plurality of views further including:
  a graph view rendering at least one graph based on at least some rows and columns of data from the operational data set.

18. The system of claim 10, wherein the operational data set is maintained in memory of at least one computing device, wherein the processing device is further configured to:
  access a plurality of data sources stored in memory separate from the memory in which the operational dataset is maintained; and
  copy data from the accessed data sources into the operational dataset.

* * * * *